(12) United States Patent
Grewal et al.

(10) Patent No.: US 11,812,362 B2
(45) Date of Patent: Nov. 7, 2023

(54) CONTAINERIZED ROUTER WITH A DISJOINT DATA PLANE

(71) Applicant: Juniper Networks, Inc., Sunnyvale, CA (US)

(72) Inventors: Ashutosh K. Grewal, Sunnyvale, CA (US); Srinivas Akkipeddi, San Ramon, CA (US); Vinay K Nallamothu, Sunnyvale, CA (US); Arijit Paul, Sunnyvale, CA (US); Mahesh Sivakumar, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/649,640

(22) Filed: Feb. 1, 2022

(65) Prior Publication Data
US 2022/0286940 A1    Sep. 8, 2022

Related U.S. Application Data

(60) Provisional application No. 63/242,434, filed on Sep. 9, 2021.

(30) Foreign Application Priority Data

Mar. 1, 2021  (IN) .............................. 202141008548

(51) Int. Cl.
*H04W 40/24*    (2009.01)
*H04L 45/02*    (2022.01)
(Continued)

(52) U.S. Cl.
CPC ........... *H04W 40/248* (2013.01); *H04L 45/04* (2013.01); *H04L 45/38* (2013.01); *H04L 45/586* (2013.01); *H04L 45/64* (2013.01); *H04L 45/741* (2013.01)

(58) Field of Classification Search
CPC ...... H04W 40/248; H04L 45/04; H04L 45/38; H04L 45/586; H04L 45/64; H04L 45/741
See application file for complete search history.

(56) References Cited

U.S. PATENT DOCUMENTS 9,571,394 B1   2/2017   Sivaramakrishnan et al.
10,200,274 B1  2/2019   Suryanarayana et al.
(Continued)

FOREIGN PATENT DOCUMENTS

WO        2013184846 A1    12/2013

OTHER PUBLICATIONS

Askari et al., "Exploiting DPDK in Containerized Environment with Unsupported Hardware", 2020 IEEE Conference on Network Function Virtualization and Software Defined Networks (NFV-SDN), IEEE, Nov. 10, 2020, pp. 7-12.
(Continued)

*Primary Examiner* — Kibrom T Hailu
(74) *Attorney, Agent, or Firm* — Shumaker & Sieffert, P.A.

(57) ABSTRACT

In general, this disclosure describes techniques for a containerized router operating within a cloud native orchestration framework. In an example, a computing device comprises processing circuitry; a containerized set of workloads; a containerized routing protocol process configured to execute on the processing circuitry and configured to receive routing information; a kernel network stack executing on the processing circuitry and configured to forward packets based on first routing information from the containerized routing protocol process; and a data plane development kit (DPDK)-based virtual router executing on processing circuitry and configured to forward traffic to and from the workloads based on second routing information from the containerized routing protocol process.

19 Claims, 16 Drawing Sheets

(51) Int. Cl.
  *H04L 45/64* (2022.01)
  *H04L 45/586* (2022.01)
  *H04L 45/741* (2022.01)
  *H04L 45/00* (2022.01)

(56) References Cited

U.S. PATENT DOCUMENTS

| | | | |
|---|---|---|---|
| 10,534,601 B1 | 1/2020 | Venkata et al. | |
| 10,623,322 B1 | 4/2020 | Nallamothu | |
| 10,728,145 B2 | 7/2020 | Rao et al. | |
| 2018/0357086 A1 | 12/2018 | Kinsella | |
| 2019/0081955 A1 | 3/2019 | Chugtu et al. | |
| 2019/0310871 A1 | 10/2019 | Desmouceaux et al. | |
| 2020/0073692 A1 | 3/2020 | Rao et al. | |
| 2020/0106744 A1 | 4/2020 | Miriyala et al. | |
| 2020/0112487 A1 | 4/2020 | Inamdar et al. | |
| 2020/0278892 A1* | 9/2020 | Nainar | H04L 67/10 |
| 2020/0322143 A1 | 10/2020 | Voit | |
| 2020/0374186 A1 | 11/2020 | Scott | |
| 2021/0019194 A1 | 1/2021 | Bahl | |
| 2021/0075730 A1* | 3/2021 | Palermo | H04L 47/6275 |
| 2021/0297347 A1 | 9/2021 | Xu | |
| 2022/0103460 A1* | 3/2022 | Yu | H04L 45/64 |
| 2022/0109605 A1* | 4/2022 | Doshi | G06F 8/60 |
| 2022/0329486 A1 | 10/2022 | Nagaprakash et al. | |
| 2023/0034448 A1 | 2/2023 | Yu et al. | |

OTHER PUBLICATIONS

Juniper Networks, Inc, "O-Ran Alliance—Virtual Exhibition", Jun. 6, 2021, 2 pp., https://www.virtualexhibition.o-ran.org/classic/generation/2021/category/intelligent-ran-control-demonstrations/sub/intelligent-control/94.

Juniper Networks, Inc, "Simplifying Operability & Manageability with Cloud-Native Routing", Nov. 17, 2021, 2 pp., https://www.juniper.net/us/en/the-feed/topics/5g/get-connected-podcast-episode-2-simplifying-operability-and-manageability-with-cloud-native-routing-podcast.html.

Kn et al., "Day One: Contrail DPDK vRouter", Juniper Networks, Jan. 1, 2021, 196 pp.

Mali et al., "Day One: Cloud Native Routing With cRPD", Juniper Networks, Aug. 3, 2021, 93 pp.

Rosen et al., "BGP/MPLS IP Virtual Private Networks (VPNs)", Network Working Group, RFC4364, Feb. 2006, 47 pp.

U.S. Appl. No. 17/305,110, filed Jun. 30, 2021, naming inventors Nagaprakash et al.

* cited by examiner

CONTAINERIZED ROUTER WITH A DISJOINT DATA PLANE

The application claims the benefit of U.S. Provisional Application No. 63/242,434, filed 9 Sep. 2021, and of India Application No. 202141008548, filed 1 Mar. 2021; the entire content of each application is incorporated herein by reference.

TECHNICAL FIELD

The disclosure relates to virtualized computing infrastructure and, more specifically, to a containerized router.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, this disclosure describes techniques for a containerized router operating within a cloud native orchestration framework. The techniques may involve, in at least some aspects, deploying a logically-related group of one or more containers ("pod") that supports the Data Plane Development Kit (DPDK) to support fast path packet communication on a data channel between a virtual router and the pod. A container networking interface plugin (CNI) is a networking solution for application containers and is a runtime executable that assists with configuring interfaces between containers and other components of the computing device ("host") hosting the container, which may be a member of a pod. The computing device may be alternatively referred to as a "compute node" or "server". The CNI typically assigns the network address (e.g., IP address) to the network interface and may also add routes relevant for the interface, such as routes for the default gateway and one or more nameservers.

In an aspect of the disclosure, techniques are described for a virtualized cell-site router having containerized applications for implementing distributed units (DUs) on compute nodes. The virtualized router may be referred to herein as a "cell-site" router in that the compute nodes on which the containerized applications of the router execute may implement and/or comprise components of a cellular network, such as components of a local data center or network associated with one or more 5G cellular base stations of a radio access network (RAN). At least in some cases, the compute nodes include a DPDK-based virtual router for the data plane.

In aspect of the disclosure, a containerized routing protocol daemon (cRPD) is a routing protocol process that is packaged as a container to run in an underlying environment, e.g., a Linux-based environment. cRPD may be executed in the user space of the host as a containerized process. Thus, cRPD makes available the rich routing software pedigree of physical routers on Linux-based compute nodes. cRPD provides control plane functionality. Existing implementations of cRPD (running on the host) use the forwarding provided by the Linux kernel. This control plane is thus containerized.

A virtual router is the software entity that provides packet routing and forwarding data plane functionality on the compute node. The compute node may be hosting VMs or containers centrally orchestrated and provisioned. The virtual router may work with an SDN controller to create the overlay network by exchanging routes, configurations, and other data. A virtual router can run as either a Linux kernel module or a DPDK-based process. DPDK allows a virtual router to process more packets per second than is possible when running as a kernel module. This virtual router data plane may be containerized. In combination, the containerized cRPD and containerized DPDK-based virtual router may thus be a fully functional containerized router.

The compute node may be used to implement parts of a ($5^{th}$ generation) cellular network using cloud-native, Open Radio Access Network ("O-RAN" or "Open RAN") architecture. The cloud may be built with containers and Kubernetes. The cell-site router functionality may be realized on compute nodes that host Distributed Unit (DU) 5G functionality as containerized applications. That is, DU functionality may be realized as Kubernetes Pods on these compute nodes. At a very high level, the DU functionality will consume RAN traffic, process it, and send it over tunnels to the Control Unit functionality (CU) hosted in a data center.

To meet the rich routing functionality and forwarding performance requirements for this 5G network use case, the compute nodes may be configured to use an integrated scheme in which a cRPD running on the compute node operates as the control plane and configures a DPDK-based virtual router as a corresponding fast path forwarding plane for mobile network traffic that is to be processed by a containerized DU.

In an aspect of the disclosure, a generic data plane model is decoupled from a network controller for virtualized computing infrastructure. For example, a data plane according to this aspect can expose application programming interfaces (APIs) that can be implemented by any control-plane service. In some examples, the data plane will also have the capability to work with multiple types of CNI. The data plane may be implemented using a DPDK-based virtual router and expose a remote procedure call (e.g., gRPC) interface for exchanging control data. For instance, a virtual router agent for the virtual router data plane may operate as a gRPC server that exposes gRPC APIs for programming the virtual router data plane. The techniques include workflows for configuring virtual network interfaces for pods, where the virtual router agent obtains the information from a containerized routing protocol daemon (cRPD) in response to a request for a port from the CNI.

In an aspect of the disclosure, a containerized routing protocol daemon (cRPD) interfaces with two disjoint data planes: the kernel networking stack for the compute node and the DPDK-based virtual router. The cRPD may leverage the kernel's networking stack to set up routing exclusively for the DPDK fast path. The routing information cRPD receives can include underlay routing information and overlay routing information. The cRPD may run routing protocols on the vHost interfaces that are visible in the kernel, and the cRPD may install forwarding information base (FIB) updates corresponding to interior gateway protocol (IGP)-learned routes underlay) in the kernel FIB (e.g., to enable establishment of multi-hop interior Border Gateway Protocol (iBGP) sessions to those destinations). Concurrently, the DPDK-based virtual router may notify the cRPD about the Application Pod interfaces created by the CNI for the compute node. Such Pod interfaces may not be advertised to or otherwise made known to the kernel. The cRPD may advertise reachability to these Pod interfaces to the rest of the network as, e.g., L3VPN network layer reachability information (NLRI). Corresponding Multi-Protocol Label Switching (MPLS) routes may be programmed on the virtual router but not to the kernel, for the next-hop of these labels is a "POP and forward" operation to the Pod interface, and these interfaces are only visible in the virtual router. Similarly, reachability information received over BGP L3VPN may only be programmed to the virtual router, for only PODS need such reachability information for forwarding. That is, the kernel may not have any use for or applications that need such reachability information.

In an aspect of the disclosure, to provide high availability of network connectivity, when adding the DPDK interface to an application Pod instantiated on a compute node, the CNI may also add a second, backup interface into the application Pod. The backup interface may be configured on a different, backup dataplane within the compute node than from the active data plane on which the active interface is configured. For example, the active data plane may be a DPDK-based virtual router, while the backup data plane may be a kernel-based virtual router.

In an aspect of the disclosure, a set of software components provides CNI functionality that address networking requirements unique to cloud native 5G network environments. The software components include a containerized routing protocol daemon (cRPD) to support a Network Service Mesh (NSM) architecture. The set of software components support NSM architecture and may provide additional capabilities such as hybrid networking (between physical and virtual infrastructure), direct reachability to a Pod from outside a cluster of compute nodes to, e.g., advertise over protocols such as BGP, set up tunnels dynamically using various technologies such as MPLS, SRv6, IP-IP/VxLAN/GRE, IPsec, etc. In a use case of this aspect, a 5G O-RAN network may be deployed using cloud native technologies and follow the 5G split in which the DU (Distributed Unit) and CSR (Cell Site Router) are virtualized and run on a compute node. The set of software components may operate as a cell-site router to provide L3 reachability for the mid-haul for the 5G network.

The software components use cRPD to distribute Layer 3 (L3) network reachability information of the Pods not just within the cluster, but also outside the cluster. The cRPD also programs the data plane on each compute node. For better network packet I/O performance, the DU application may run in the application Pod to bypass the kernel networking stack and abstractions, and thereby use, e.g., zero-copy mechanisms to directly send/receive packets from the physical NIC. Data Plane Development Kit (DPDK) is one such framework, and a DPDK-based virtual router may be used as a user space data plane that leverages DPDK for high forwarding performance for this purpose.

The software components may include a DPDK-based virtual router to support DPDK applications. A CNI plugin manages the DPDK configuration for application and programs the virtual router. This may include setting up a vhost control channel and assigning IP (e.g., both IPv4 and IPv6)

and MAC addresses, advertising the Pod IP addresses, and detecting and withdrawing the routes when the Pod is considered down or removed.

The various aspects described in this disclosure may be used together in any combination of the aspects. "DAY ONE: CONTRAIL DPDK vROUTER," 2021, Kiran K N et al., Juniper Networks. Inc., is incorporated by reference herein in its entirety. "DAY ONE: CLOUD NATIVE ROUTING WITH cRPD," 2021, Hitesh Mali et al., Juniper Networks, Inc., is incorporated by reference herein in its entirety.

In an example, a computing device comprises processing circuity; a containerized set of workloads; a containerized routing protocol process configured to execute on the processing circuitry and configured to receive routing information; a kernel network stack executing on the processing circuitry and configured to forward packets based on first routing information from the containerized routing protocol process; and a data plane development kit (DPDK)-based virtual router executing on processing circuitry and configured to forward traffic to and from the workloads based on second routing information from the containerized routing protocol process.

In an example, a method comprises receiving, by a containerized routing protocol process executing on a computing device, routing information; receiving, by a kernel executing on the computing device and executing a kernel network stack, first routing information from the containerized routing protocol process; forwarding, by the kernel, packets based on the first routing information received from the containerized routing protocol process; receiving, by a data plane development kit (DPDK)-based virtual router, second routing information from the containerized routing protocol process; and forwarding, by the virtual router, traffic to and from a containerized set of workloads based on the second routing information received from the containerized routing protocol process.

In an example, a non-transitory computer-readable storage medium is encoded with instructions that, when executed, cause processing circuitry to perform operations comprising: receiving, by a containerized routing protocol process of a computing device, routing information; receiving, by a kernel of the computing device that includes a kernel network stack, first routing information from the containerized routing protocol process; forwarding, by the kernel, packets based on the first routing information received from the containerized routing protocol process; receiving, by a data plane development kit (DPDK)-based virtual router, second routing information from the containerized routing protocol process; and forwarding, by the virtual router, traffic to and from a containerized set of workloads based on the second routing information received from the containerized routing protocol process.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

Figure 1:
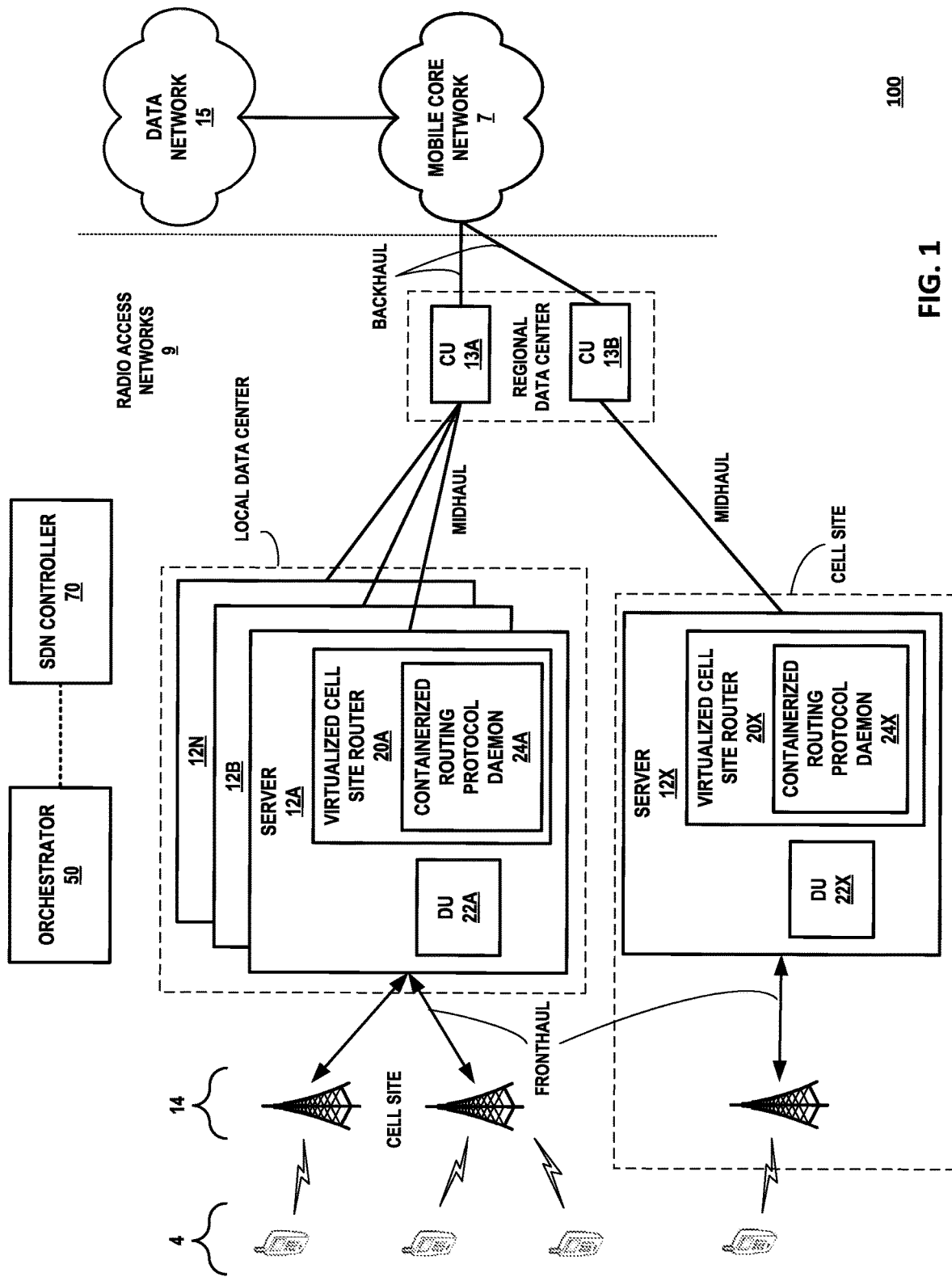
FIG. 1 is a block diagram illustrating an example mobile network system, in accordance with techniques described in this disclosure.

DETAILED DESCRIPTION 5G uses a cloud-native approach in which functional blocks are decomposed into microservices. The microservices are deployed as containers on x86 platforms, orchestrated by Kubernetes (abbreviated as "K8s"). This includes 5G core control plane functions such Access and Mobility Management Function (AMF) and Session Management Function (SMF), RAN control plane functions such as CU-CP, service management and orchestration (SMO), Near-Real Time & Non-Real Time Radio Intelligent Controller (RIC) and even some data-plane functions such as CU-DP and DU.

K8s networking between pods is via plug-ins called Container Networking Interfaces (CNIs) (also known as Container Network Interface plugins). However, the networking capabilities of typical CNIs are rather rudimentary and not suitable when the containerized network functions the CNI serves play a pivotal role within a telecommunications network. A Cloud Native Router, as described herein, provides a better fit for these situations. A Cloud Native Router is a containerized router that allows an x86 or ARM based host to be a first-class member of the network routing system, participating in protocols such as Intermediate System to Intermediate System (IS-IS) and Border Gateway Protocol (BGP) and providing Multiprotocol Label Switching/Segment Routing (MPLS/SR) based transport and multi-tenancy. In other words, rather than the platform being an appendage to the network (like a customer edge (CE) router), it may be operating as a provider edge (PE) router.

A Cloud Native Router may have one or more advantages over a conventional router. A router has a control plane and a forwarding plane. The control plane participates in dynamic routing protocols and exchanges routing information with other routers in the network. It downloads the results into a forwarding plane, in the form of prefixes, next-hops and associated SR/MPLS labels. Implementations described herein are modular, in the sense that the control plane is agnostic to the exact details of how the forwarding plane is implemented. In a hardware router, the forwarding plane may be based on custom ASICs. In contrast, the Cloud Native Router is a virtualized router. However, the routing protocol software is functionally similar in both cases. This means the Cloud Native Router benefits from the same highly comprehensive and robust protocol implementation as the hardware-based routers that underpin some of the world's largest networks.

The Cloud Native Router uses a containerized routing protocol daemon (cRPD) Control Plane and a virtual router (vRouter) forwarding plane to deliver high performance networking in a small footprint, soft package that is functionally similar to a non-virtual router, a physical network function (PNF). The forwarding plane may be implemented via a choice of DPDK, Linux Kernel or Smart-NIC. The complete integration delivers a K8s CNI-compliant package, deployable within a K8s environment (e.g., Multus-enabled).

The Cloud Native Router may be incorporated into the host on which it resides and integrated with K8s. By way of example, this disclosure describes how a DU and a Cloud Native Router can co-exist on the same 1 U size x86 or ARM based host or other computing device. This is especially attractive for those cell-sites that have limited power and space, as it avoids the need for a two-box solution, in the form of a separate DU and router. Multiple O-DUs, or other workloads, can be attached to the same Cloud Native Router.

The cell-site server may be a K8s worker node (or "minion"). The O-DU pod is plumbed into the Cloud Native Router. The O-DU may require multiple network interfaces, facilitated in some cases by the Multus meta-CNI. Each of these interfaces can be mapped into a different Layer 3 VPN on the Cloud Native Router to support multiple network slices. A CNI described herein, when triggered by K8s pod events, dynamically adds or deletes interfaces between the pod and the vRouter container. It also dynamically updates the cRPD control plane container with host routes for each pod interface and corresponding Layer 3 VPN mappings, in the form of Route Distinguishers and Route Targets. The Layer 3 VPNs may be implemented using virtual routing and forwarding instances (VRFs). In turn, the cRPD control plane programs the vRouter forwarding plane accordingly via a gRPC interface. In this way, the Cloud Native Router is introduced into the data path, supporting the F1 interfaces to the CUs running in edge or regional DC sites.

While described primarily with respect to O-RAN applications such as the Distributed Units, the Cloud Native Router techniques are applicable for configuring host-based virtual router for other containerized applications.

As the CNR is itself a cloud-native application, it supports installation using K8s manifests or Helm Charts. These include the initial configuration of the router, including routing protocols and Layer 3 VPNs to support slices. A CNR may be orchestrated and configured, in a matter of seconds, with all of the routing protocol adjacencies with the rest of the network up and running. Ongoing configuration changes during the lifetime of the CNR, for example to add or remove network slices, may be via a choice of CLI, K8s manifests, NetConf or Terraform.

By adopting a K8s CNI framework, the Cloud Native Router may mitigate the traditional operational overhead incurred when using a containerized appliance rather than its physical counterpart. By exposing the appropriate device interfaces, the Cloud Native Router may normalize the operational model of the virtual appliance to the physical appliance, eradicating the barrier to adoption within the operator's network operations environment. The Cloud Native Router may a familiar routing appliance look-and-feel to any trained operations team. The Cloud Native Router has similar features and capabilities, and a similar operational model as a hardware-based platform. Likewise, a domain-controller can use the protocols that it is uses with any other Junos router to communicate with and control the Cloud Native Router, for example Netconf/OpenConfig, gRPC, Path Computation Element Protocol (PCEP) and Programmable Routing Daemon (pRPD) APIs.

The node executing Cloud Native Router may participate in IS-IS, Open Shortest Path First (OSPF), BGP, and/or other interior or exterior routing protocols. In addition, MPLS may be used, often based on Segment Routing (SR). The reason for this is two-fold: to allow Traffic Engineering if needed, and to underpin multi-tenancy, by using MPLS-based Layer 3 VPNs. As an alternative, SRv6 could be used instead to fulfill these requirements. Having a comprehensive routing capability is also necessary to implement network slicing. Each slice tenant is placed into its own Layer 3 VPN. The Cloud Native Router acts as a provider edge (PE) router from the Layer 3 VPN point of view. The Cloud Native Router therefore exchanges Layer 3 VPN prefixes via BGP with other PE routers in the network, regardless of whether those other PEs are physical routers or Cloud Native Routers residing on other hosts. Each tenant may be placed in a separate VRF table on each PE, giving the correct degree of isolation and security between tenants, just as with a conventional Layer 3 VPN service. This neatly solves the problem that K8s does not natively provide such isolation. Layer 3 VPN is a tried and tested method for achieving multi-tenancy in networking and is trusted by the many major corporations worldwide who buy this service from their network service providers.

Usually, the transport network offers a variety of paths, each tuned to a particular cost-function such as minimum latency or high-bandwidth. These are implemented using Segment Routing flex-algo or RSVP or Segment Routing-based traffic engineering. When traffic-engineering is used, the paths can be computed by a controller and communicated to the Cloud-Native Router via the PCEP protocol. When the controller detects congestion in the network via streaming telemetry, it automatically recomputes the affected paths to ease the congestion. PE routers, including the Cloud-Native Routers, apply tags (BGP color communities) to the prefixes in a given VRF according to the type of path that the corresponding slice needs. For example, a first slice may need the lowest latency transport that is possible, and so is mapped to a low-latency path in order to reach the O-CU in an Edge Data Center (EDC). A second slice needs high-bandwidth with reasonably low latency. Therefore its O-CU is also located in the EDC, and the traffic is mapped to a high-bandwidth path to the EDC. A third slice needs high-bandwidth transport but is not latency-sensitive, so its O-CU may be placed in the Regional Data Center (RDC). Traffic for the third slice is mapped into the high-bandwidth path to the RDC. In actual deployments, in which there will be many more slices, the mapping of slices to a transport path will normally be many-to-one. For example, all of the slices that need low-latency transport between a given pair of endpoints share the same low-latency traffic-engineered or flex-algo path that connects those two endpoints.

In summary, the Cloud Native Router may bring the full spectrum of routing capabilities to compute platforms that host containerized network functions. This may allow the platform to fully participate in the operator's network routing system and facilitate multi-tenancy and network slicing. It may provide the same familiar look-and-free, operational experience and control-plane interfaces as a hardware-based router.

FIG. 1 is a block diagram illustrating an example mobile network system, in accordance with techniques described in this disclosure. Mobile network system 100 may be a 5G network that implements 5G standards promulgated by, e.g., the $3^{rd}$ Generation Partnership Project (3GPP), the Open Radio Access Network ("O-RAN" or "ORAN") Alliance, the European Telecommunications Standards Institute (ETSI), the Internet Engineering Task Force (IETF), and the International Telecommunication Union (ITU).

5G networks allow for disaggregation of mobile fronthaul and midhaul networks by building then around cloud native principles. As a result, service providers may avoid becoming locked into particular appliance vendors and may combine effective solutions from different vendors at different layers and locations to build and provision the mobile network system. This can improve the radio access networks (RANs), in particular, by making them more open, resilient, and scalable.

O-RAN-based networks decompose the baseband unit (BBU) found in traditional telco networks into three functional units: a Radio Unit (RU), a Distributed Unit (DU), and a Centralized Unit (CU). Different functions of RUs, DUs, and CUs may be implemented by software executed by x86-based or ARM-based host servers. The CU can be further segregated into distinct control plane (CU-CP) and user plane (CU-UP) functions to further control and user plane separation (CUPS). This decoupling helps bring flexibility to deployment—different combinations of RU, DU, and CU may be deployed at the same location, or at different locations. For example, where latency is critical, RU, DU, and CU can be placed together at the edge. DUs and CUs that conform to O-RAN are often referred to as O-DUs and O-CUs, respectively. Additional data plane elements known as user plane functions (UPFs) operate in mobile core network 7 to forward traffic between the CU and data network 15. Additional control plane elements operate in mobile core network 7. These control plane elements include Network Slice Selection Function (NSSF), Policy Control Function (PCF), Authentication Server Function (ASUF), Access and Mobility Management Function (AMF), Network Exposure Function (NEF), Network Function Repository Function (NRF), Application Function (AF), Unified Data Management (UDM), and Session Management Function (SMF).

Mobile network system 100 includes radio access networks 9 and mobile core network 7. Radio access networks 9 include RUs 14 located at various cellular network sites ("cell sites"). Each RU 14 consists of an LO PHY and a RF transmitter. The LO PHY component may be implemented using specialized hardware for high-performance packet processing.

RUs 14 connect to DUs 22A-22X (collectively, "DUs 22") via the fronthaul network. The fronthaul network connects LO PHY and HI PHY and is used by RUs 14 and DUs 22 to implement the F2 interface of 5G. DUs 22 manage the packet transmission of radio by the RUs 14. In some cases, such packet transmission conforms to the Common Packet Radio Interface (CPRI) and/or to the enhanced CPRE (eCPRI) standard, or to IEEE 1914.3. DUs 22 may implement the Radio Link Control (RLC), Media Access Control (MAC), and the HI PHY layer. DUs 22 are at least partially controlled by CUs 13A-13B (collectively, "CUs 13").

DUs 22 connect to CUs 13 via the midhaul network, which may be used by DUs 22 and CUs 13 to implement the F1 of 5G. CUs 13 may implement the Radio Resource Control (RRC) and Packet Data Convergence Protocol (PDCP) layers. CUs 13 connect to mobile core network 7 via a backhaul network. The midhaul and backhaul networks may each be wide area networks (WANs).

In radio access networks 9 of mobile network system 100, the gNodeB includes one of CUs 13 and one of DUs 22. A CU may support multiple DUs to implement multiple gNodeBs. And one or more RUs may be supported by a single DU. Thus, for example with respect to FIG. 1, CU 13A and DU 22A and one of RUs 14 may form one eNodeB, while CU 13A and DU 22B (of server 12B) and another one of RUs 14 may form another eNodeB.

As shown in FIG. 1, any DU of DUs 22 may or may not be located at the cell site that includes the RU(s) 14 supported by the DU. DU 22X is located at the cell site, while DUs 22A-22N are located at a local data center and collectively support multiple RUs 14. Mobile network system 100 may have radio access networks 9 that include many thousands of cell sites, each having one or more RUs 14s and optionally one or more DUs 22. Whether located at a cell site or offsite, a DU is typically within 20 km of the supported RUs. CUs 13 are shown in FIG. 1 as located at a regional data center, typically within 40 km of the supported DUs 22.

Radio access networks 9 connect to mobile core network 7 to exchange packets with data network 15. Mobile core network 7 may be a 5G core network, and data network (DN) 15 may represent, for example, one or more service provider networks and services, the Internet, $3^{rd}$ party services, an IP-multimedia subsystem, or other network.

Mobile network system 100 includes multiple servers 12A-12X to execute DUs 22. Each of servers 12 may be a real or virtual server that hosts/executes software that implements DUs 22. Such software may include one or more applications deployed as, e.g., virtual machine or containers, to servers 12. While not shown in FIG. 1, CUs 13 may also be executed by servers.

The combination of DUs 22, the midhaul network, CUs 13, and the backhaul network effectively implement an IP-based transport network between the radio units 14 and mobile core network 7.

In accordance with techniques of one or more aspects of this disclosure, virtualized cell site routers 24A-24X ("vCSRs 20A-20X" and collectively, "vCSRs 20") provide layer 3 routing functionality between DUs 22 and CUs 13. These vCSR 24 may be executed on the same server 12 as one or more DUs 22 to provide provider edge router functionality to such DUs 22. Although each of vCSRs 20 is termed a "cell site" router, any of vCSRs 20 may be deployed to a local data center together with one or more DUs 22 for which the vCSR provides IP services, as shown with respect to vCSRs 20A-20N, i.e., where the local data center includes servers 12 that execute DUs 22 for one or more cell sites.

Each of vCSRs 20 is implemented using one of containerized routing protocol daemons 20A-20X ("cRPDs 24A-24X" and collectively, "cRPDs 24"). More specifically, each of vCSRs 20 uses a corresponding cRPD of cRPDs 24 as a control plane for implementing a layer 3 router. The cRPD provides control plane routing functions. For example, the cRPD can execute IP (IPv4/IPv6) underlay routing protocols such as Intermediate System-Intermediate System (IS-IS) and Border Gateway Protocol (BGP); advertise reachability of DUs 22 both inside and outside a cluster, e.g., to CUs 13; implement network namespaces (supported using L3VPN and EVPN Type-5 advertisements); implement Access Control Lists (ACLs) and network policies for security, network isolation, and quality of service (QoS); support tunnels and tunneling protocols (e.g., MPLS, SR-MPLS, SRv6, SR-MPLSoIPv6, SR-MPLSoIPv4, VxLAN, IP-in-IP, GRE); support dynamic tunnels signaled using BGP; support encryption for IPSec tunnels; and program a forwarding plane of the vCSR of the server with learned and/or configured routing information to provide layer 3 packet forwarding, encapsulation, packet filtering, and/or QoS between one or more of DUs 22 and one of CUs 13.

For example, vCSR 20A executed by server 12A includes cRPD 24A and a forwarding plane of server 12A (e.g., a SmartNIC, kernel-based forwarding plane, or Data Plane Development Kit (DPDK)-based forwarding plane). cRPD 24A provides one or more of the above routing functions to program a forwarding plane of vCSR 20A in order to, among other tasks, advertise a layer 3 route for DU 22A outside of the cluster—including across the midhaul network to CU 13A—and forward layer 3 packets between DU 22A and CU 13A. In this way, the techniques realize cloud-native, containerized cell site routers 20 executing on the same servers 12 as containerized DUs 22, thus significantly reducing latency on the midhaul between DUs 22 and CUs 13.

vCSRs 20 as containerized routers allow an x86-based or ARM-based host to be a first-class member of the network routing system, participating in protocols such as IS-IS and BGP and providing MPLS/SR-based transport and multi-tenancy. Thus, rather than being appendages to the network (similar to a customer edge (CE) router), vCSRs 20 may operate as provider edge (PE) routers for networks transporting layer 3 packets among DUs 22, CUs 13, and mobile core network 7.

Moreover, in some examples, the integration of cRPDs 24 and host-based forwarding planes may also deliver a Kubernetes CNI-compliant package that is deployable within a Kubernetes environment. The execution by a single server of a DU 22 and a vCSR 20 together can avoid a two-box solution with a separate DU and router, potentially reducing costs, power, and space requirements, which is particularly attractive for cell sites. Application workloads can be containerized network functions (CNFs), such as DUs.

Orchestrator 50 represents a container orchestration platform. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS. Orchestrator 50 orchestrates DUs 22 and at least containerized RPDs 24 of vCSRs 20. In some examples, the data plane of vCSRs 20 is also containerized and orchestrated by orchestrator 50. The data plane may be a DPDK-based virtual router, for instance.

Containers, including those implementing containerized routing protocol daemons 24, may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master node" and "minion nodes," while the Docker Swarm platform refers to cluster managers and cluster nodes. Servers 12 or virtual machines thereon may represent cluster nodes.

Orchestrator 50 and software defined network (SDN) controller 70 may execute on separate computing devices or execute on the same computing device. Each of orchestrator 50 and SDN controller 70 may each be a distributed application that executes on one or more computing devices. Orchestrator 50 and SDN controller 70 may implement respective master nodes for one or more clusters each having one or more minion nodes implemented by respective servers 12. In general, SDN controller 70 controls the network configuration of radio access network 9 to facilitate packetized communications among DUs 22, CUs 13, and mobile core network 7. SDN controller 70 may distribute routing and configuration information to the control plane elements of radio access networks 9, in particular, to cRPDs 24. SDN controller 70 may, for instance, program segment routing headers, configure L3VPNs, configure VRFs in routers of radio access network 9 (including virtualized cell site routers 20). SDN controller 70 may implement one or more southbound protocols for configuring router, switches, and other networks devices of the midhaul and backhaul networks, as well as for configuring vCSRs 20. Example southbound protocols may include Path Computation Element Protocol (PCEP), BGP, Netconf, OpenConfig, another protocol for configuring cRPDs 24, and so forth. Additional information regarding L3VPNs is found in "BGP/MPLS IP Virtual Private Networks (VPNs)," Request for Comments 4364, Network Working Group of Internet Engineering Task Force, February 2006, which is incorporated by reference in its entirety.

SDN controller 70 may provide a logically and in some cases physically centralized controller. In some examples, SDN controller 70 may operate in response to configuration input received from orchestrator 50 and/or an administrator/operator. SDN controller 70 may program NFV infrastructure (NFVI) such as servers 12, network switches/routers, and/or other network infrastructure. In the case of NFVI programming, SDN controller 70 may configure aspects of the operating system kernel to configure L3 IP routing, Linux bridges, iptables, network namespaces, and/or virtual switches.

Additional information of an example SDN controller 70, virtual router, and virtual router agent is found in international Application Number PCT/US2013/044378, filed Jun. 5, 2013, and entitled "PHYSICAL PATH DETERMINA- TION FOR VIRTUAL NETWORK PACKET FLOWS;" U.S. patent application Ser. No. 14/226,509, filed Mar. 26, 2014, and entitled "Tunneled Packet Aggregation for Virtual Networks;" and in U.S. patent application Ser. No. 17/305, 110, filed Jun. 30, 2021, and entitled "Network Controller Horizontal Scaling for Network Device Configurations Session Management;" each which is incorporated by reference as if fully set forth herein.

In general, orchestrator 50 controls the deployment, scaling, and operations of containers across clusters of servers 12 and the providing of computing infrastructure, which may include container-centric computing infrastructure. Orchestrator 50 and, in some cases, network controller 70 may implement respective cluster masters for one or more Kubernetes clusters. As an example, Kubernetes is a container management platform that provides portability across public and private clouds, each of which may provide virtualization infrastructure to the container management platform.

Virtualized cell site routers 20 may provide one or more technical advantages that realize at least one practical application. Existing mobile networks use a physical cell site router that is located on or close to each BBU. Physical routers often have specialized form factors, are relatively difficult to update and configure, and are relatively difficult to replace due to vendor lock-in effects. While these effects are tolerable where there are relatively few cell sites, as with 3G and 4G/LTE mobile networks, the comparatively large number of cell sites required by RANs for 5G mobile networks exacerbates the capital and operational costs related to these effects. And although 5G network providers are moving to a disaggregated RAN architecture (e.g., O-RAN), such networks still rely on a physical cell site router or a virtual machine-based router to manage routes and data traffic between the DU and the CU over the midhaul network.

Virtualized cell site routers 20 having containerized routing protocol daemons 24 alleviate many of the negative effects of deploying physical or VM-based routers at the cell site. For example, containerized RPDs 24 are more lightweight in terms of compute resources (CPU, memory) compared to VM-based routers and may be more efficient in terms of space and power utilization than VM-based and physical routers. Virtualized CSRs 20 may achieve these advantages while achieving comparable performance where DPDK-based virtual routers are used as the data plane to provide efficient and high packet I/O rate for vCSRs 20 to communicate with DUs 22. That is, having vCSR 20A and DU 22A (e.g., an O-DU) on a single physical server 12A with DPDK-based data plane can offer packet forwarding performance on par with a physical cell site router. As further examples of technical advantages, vCSRs 20 eliminate the need for physical cell site router and may reduce the space, reduce power consumption, and also reduce capital/operational expenditures. Additionally, in some examples and as described in further detail below, vCSRs 20 can be integrated into a Kubernetes infrastructure by presenting vCSRs 20 as Container Networking Interfaces (CNIs) to the orchestration platform, usable for configuring networking for the application workloads. Thus, by deploying containerized vCSRs 20/RPDs 24 for use as CNIs, integrating into mobile network system 100, and integrating into Kubernetes, the techniques may facilitate a cloud native experience for vCSR 20 deployment and configuration. Integrating in Kubernetes permits leveraging its existing mechanisms for monitoring the health of containerized RPD 24s and restarting if necessary, along with managing the life-cycle of the vCSRs 20 and in particular, containerized RPDs 24.

Figure 2:
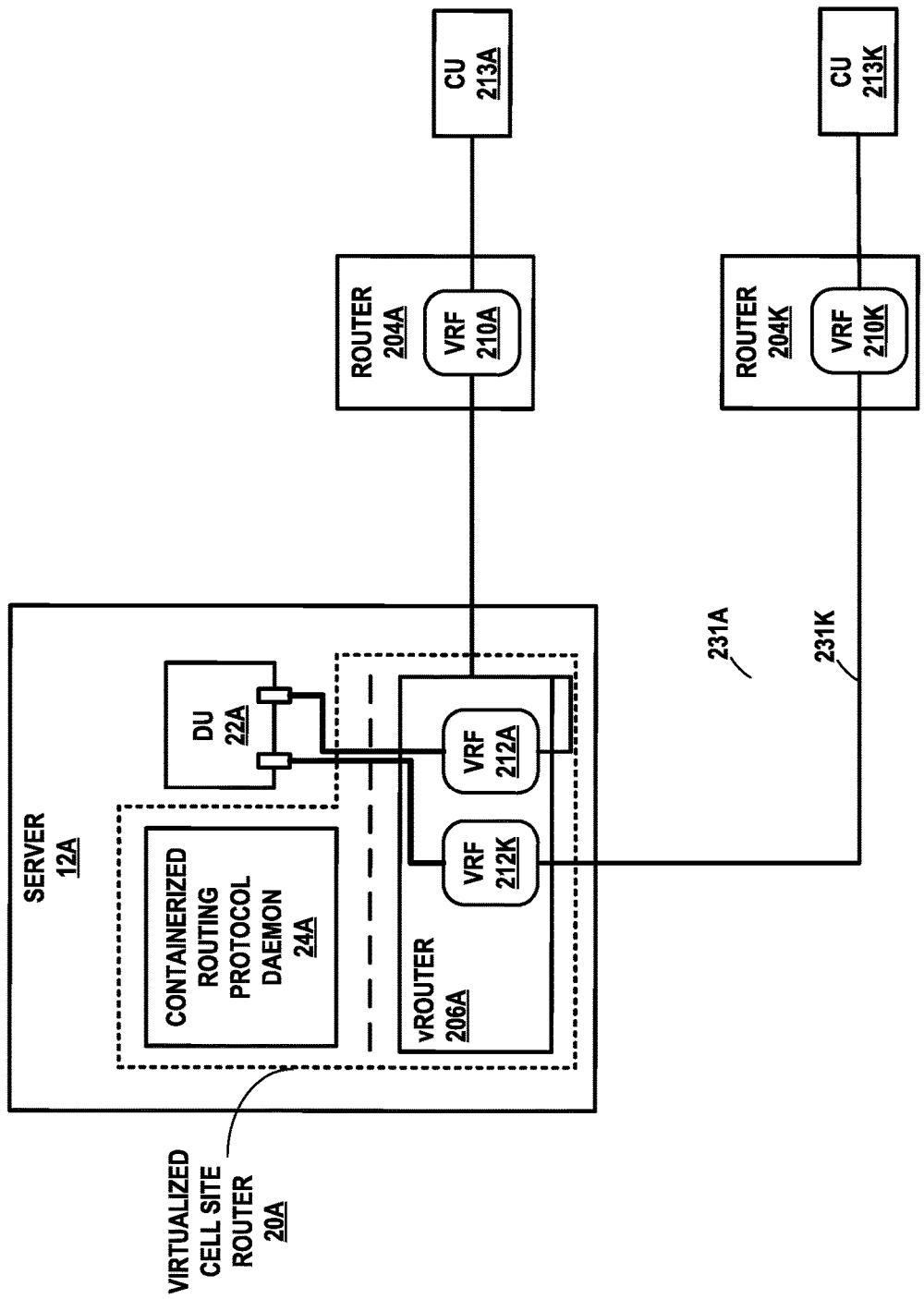
FIG. 2 is a block diagram illustrating an example implementation of a part of the mobile network system of FIG. 1 in further detail, in accordance with techniques of this disclosure.

FIG. 2 is a block diagram illustrating an example implementation of a part of the mobile network system of FIG. 1 in further detail, in accordance with techniques of this disclosure. System 200 includes CUs 213A-213K, each of which may represent any of CUs 13. In this example, multiple network slices (e.g., 5G network slices) are implemented using L3VPNs and tunnels 231A-231K to connect DU 22A to different CUs 213A-213K for respective network slices.

One of the primary technical challenges facing service providers today is the ability to deliver a wide array of network performance characteristics that future services will demand. To name a few, bandwidth, latency, packet loss, security, and reliability will greatly vary from one service to the other. Emerging applications such as remote operation of robots, massive Internet-of-Things (IOT), and self-driving cars require connectivity, but with vastly different characteristics. The combination of architecture flexibility, software programmability, and needs of different business segments (medical, factories, military, public safety, etc.) and applications have led to the creation of the concept of network slicing. A network slice provides a way to completely segment the mobile network to support a particular type of service or business or even to host service providers (multi-tenancy) who do not own a physical network. Furthermore, each slice can be optimized according to capacity, coverage, connectivity, security and performance characteristics. Since the slices can be isolated from each other, as if they are physically separated both in the control and user planes, the user experience of the network slice will be the same as if it was a separate network. A network slice can span all domains of the network including software applications (both memory and processing) running on network nodes, specific configurations of the core transport network, access network configurations as well as the end devices. The network slicing enables multiple operators to share a mobile network securely but by separating their own users from others, and different applications of a user to use different network slices that provide widely different performance characteristics.

Virtualized cell site router 20A includes a virtual router forwarding plane (vRouter) 206A configured with VRFs 212A-212K (collectively, "VRFs 212") for respective network slices implemented with respective L3VPNs, which vCSR 20A and routers 204A-204B implement using tunnels 231A-231K connecting VRFs 212 to VRFs 210A-210K on routers 204A-204B. Each of tunnels 231A-231K may represent a SR-MPLSoIPv6 or other type of tunnel mentioned above. Each of routers 204A-204K may be a gateway router for a data center having one or more servers to execute any one or more of CUs 213A-213K. The data center may include a data center fabric to switch mobile data traffic between the router and the CU. In some cases, the one or more servers of the data center may also execute a UPF for the mobile network, in which case the data center fabric may also switch mobile data traffic between the CU and the UPF.

Each of the VRFs 212A-212K has a corresponding virtual network interface to DU 22A. Each of the virtual network interfaces of DU 22A may thus be mapped into a different L3VPN in vCSR 20A in order to, e.g., support a different one of multiple network slices. As described in further detail below, a CNI of server 12A, when triggered by pod events from orchestrator 50, dynamically adds or deletes virtual network interfaces between the pod (here deployed with DU 22A) and the vRouter 206A, which may also be deployed as container in some examples. The CNI also dynamically updates cRPD 24A (the control plane of vCSR 20A) with host routes for each DU 22A/pod virtual network interface and corresponding Layer 3 VPN mappings, in the form of Route Distinguishers and Route Targets. In turn, cRPD 24A programs vRouter 206A (the data plane of vCSR 20A) accordingly, optionally using a gRPC interface. In this way, vCSR 20A is introduced as a cloud-native router into the data path to, e.g., support the F1 interfaces to CUs 213A-213K that may be executing in edge or regional data center sites, for instance. Virtual router 206A may represent a SmartNIC-based virtual router, kernel-based virtual router, or DPDK-based virtual router in various examples.

Figure 3A:
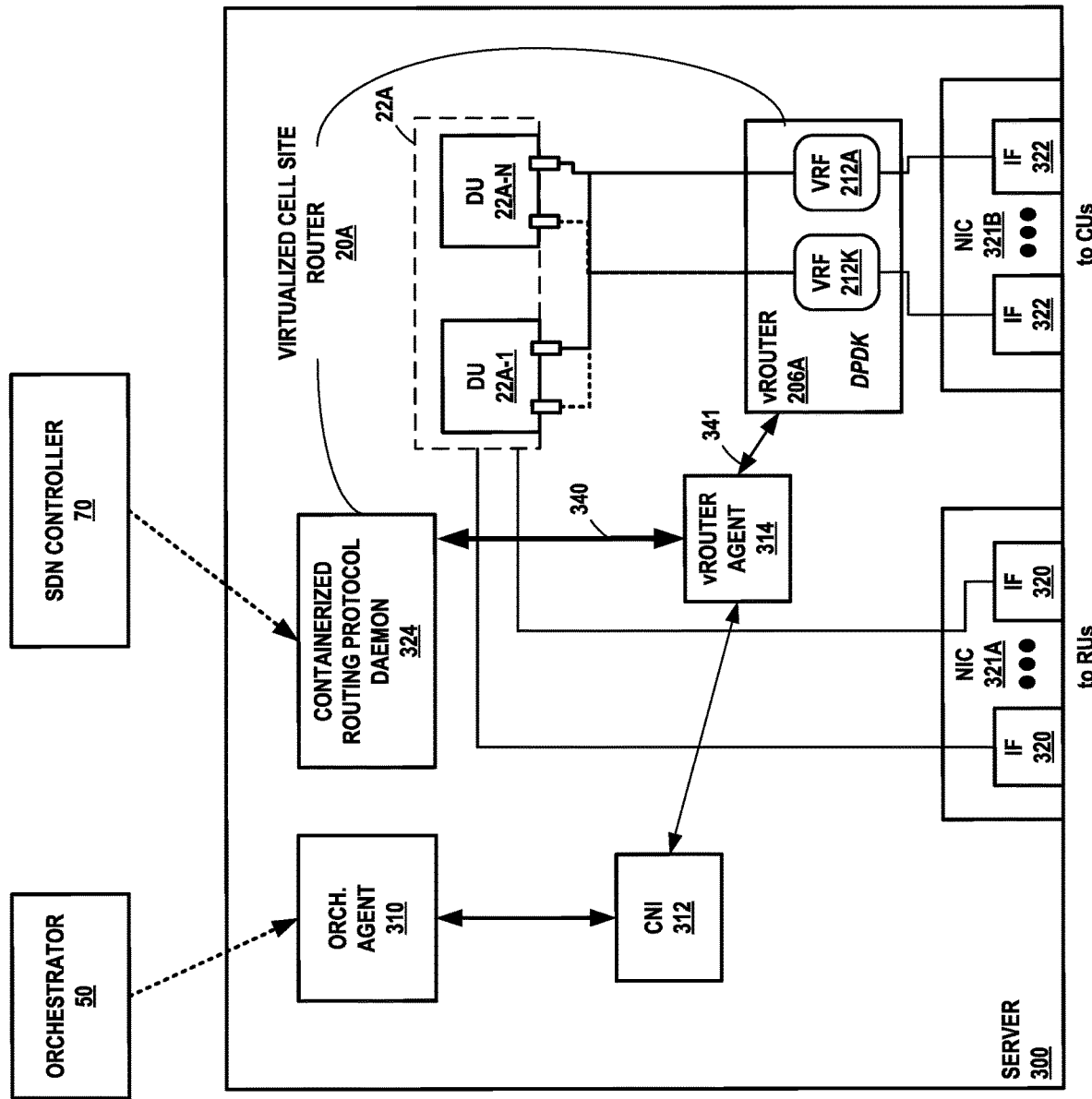
FIGS. 3A-3B are block diagrams illustrating example instances of a server that implements a virtualized cell site router, in accordance with techniques of this disclosure.
Figure 3B:
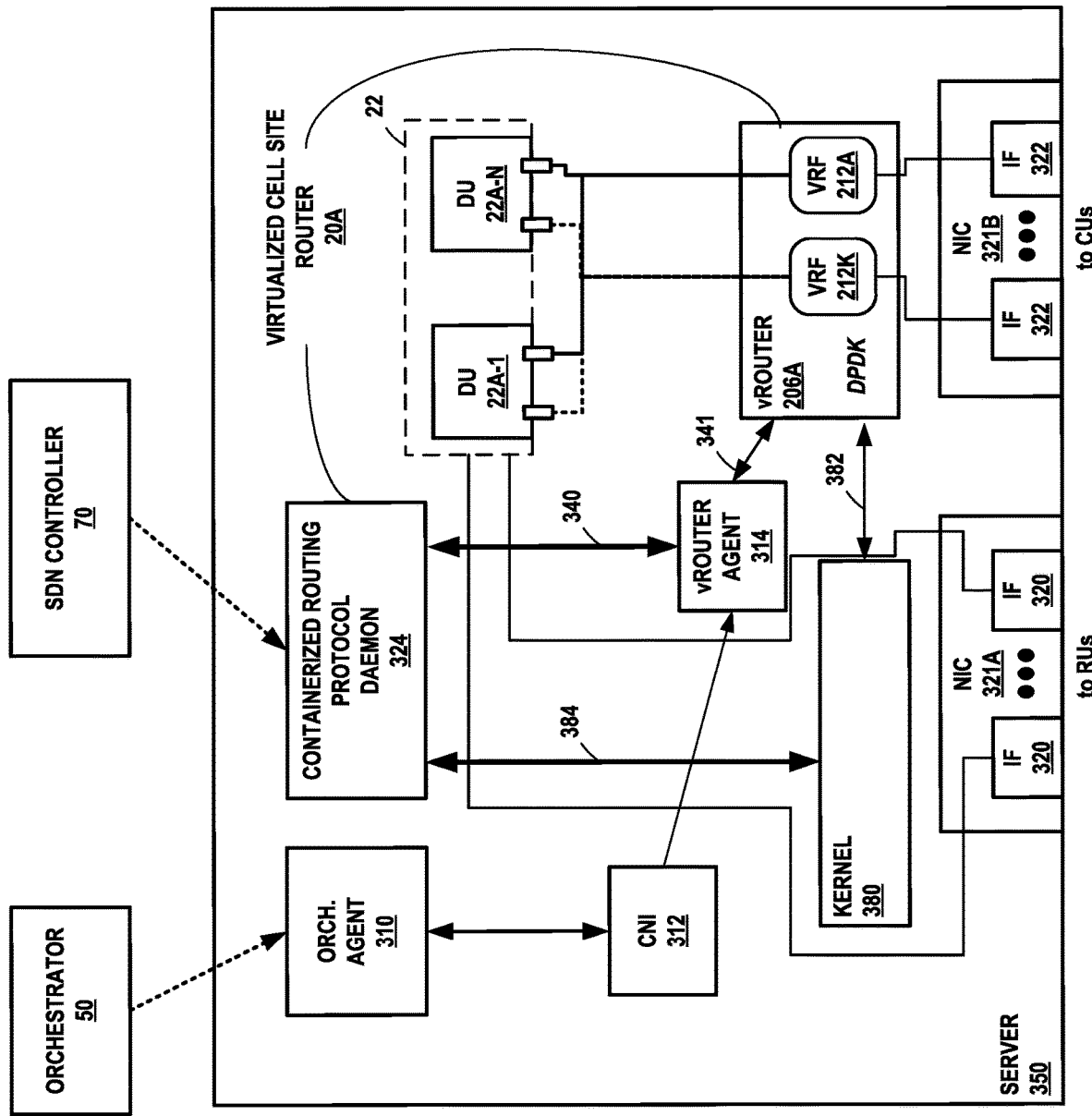

FIGS. 3A-3B are block diagrams illustrating example instances of a server that implements a virtualized cell site router, in accordance with techniques of this disclosure. Servers 300, 350 may each represent any of servers 12 of FIG. 1. In some cases, servers 300, 350 are configured to implement both a virtualized cell site router and distributed unit for same-box forwarding of mobile data traffic between DU 22A and the data plane of virtualized cell site router 20A. Servers 300, 350 may each be a bare-metal server or a virtual machine. An example hardware architecture for servers 300, 350 is described in FIG. 8.

Servers 300, 350 include one or more network interface cards (NICs) 321A-321B (collectively, "NICs 321") each having one or more hardware interfaces. In a 5G radio access network deployment, interfaces 320 of NIC 321A may be coupled via physical cabling to RUs. Interfaces 320 may implement the F2 interface. Interfaces 322 of MC 321B may be coupled via physical cabling to the midhaul network, for sending/receiving mobile data traffic to/from CUs. Interfaces 322 may implement the F1 interface.

At a high level, a DPDK-based virtual router data or forwarding plane ("vRouter") 206A is programmed by vRouter agent 314 with forwarding information for implementing a packet fast path. vRouter agent 314 may be a user space process. vRouter agent 314 may have a northbound interface 340 for receiving configuration and routing information from control plane processes, such as cRPD 324. cRPD 324 may be an example of cRPD 24A of FIG. 1. vRouter agent 314 has a southbound interface 341 for programming vRouter 206A. An example implementation for interface 340 is described in further detail with respect to FIG. 5. Reference herein to a "virtual router" may refer to the virtual router forwarding plane specifically, or to a combination of the virtual router forwarding plane (e.g., vRouter 206A) and the corresponding virtual router agent (e.g., vRouter agent 314).

cRPD 324 may have a northbound interface for exchanging configuration and routing information with SDN controller 70. Containerized networking interface 312 may be a CNI plugin that configures the interfaces of the container workloads (DUs 22A-1 to 22A-N in this example) with the DPDK-based vRouter 206A. Orchestrator 50 may orchestrate DPDK-based vRouter 206A, cRPD 324, and/or DU 22 workloads. In some cases, workloads may have multiple interfaces and multiple types of interfaces (e.g., some with vRouter 206A and some with NIC 321A). Thus, CNI 312 may represent a combination of CNIs or unified CNI that is capable of configuring a workload with multiple types of interfaces. The multiple CNIs may be controlled by a master CNI such as Multus. Where orchestrator 50 is a Kubernetes master, CustomResourceDefinitions (CRDs) may be implemented for orchestrator 50 for supporting multi-tenancy and network isolation.

Orchestrator 50 orchestrates pods comprising container workloads. In some examples, CNI 312 configures a virtio interface for each pod as a vhost-user interface of the DPDK-based vRouter 206A. In some examples, CNI 312 configures veth pairs for each pod to vRouter 206A. vRouter agent 314 may collect and output telemetry data to a telemetry collector, e.g., in the form of syslogs. In some examples, vRouter 206A has a bonded interface to NIC 321B, which may be an Intel-based NIC that supports DPDK. Bonded interfaces facilitate packet load balancing among fabric interfaces.

In a Kubernetes deployment, CNI 312 provides networking for application workloads. This includes, for example, setting up interfaces, IP address management, and access control lists; advertising reachability of workloads within the Kubernetes cluster comprising any of servers 300, 350 (examples of Kubernetes minion nodes); and setting up network namespaces.

CNI 312 may leverage cRPD 324 to expand its control plane capabilities and facilitate virtualized cell site router 20A that is on-box with the application workloads DUs 22A-1 to 22A-N. cRPD 324 may incorporate elements of network service mesh architecture (NSM), service discovery, external endpoints, and tunneling. cRPD 324 may use exterior routing protocols such as Border Gateway Protocol (BGP) to advertise pod reachability both within and outside the Kubernetes cluster. cRPD 324 may use interior gateway and other routing protocols such as IS-IS, OSPF, Label Distribution Protocol (LDP), etc., to participate in underlay networking. cRPD 324 may also provide support for advanced L3VPN overlays using protocols/technologies such as MPLS, MPLSoUDP, or MPLSoGRE tunneling; VxLANs; SR-MPLS, SRv6, SRv4, and/or IPSec.

cRPD 324 operates as the control plane for vCSR 20A, while vRouter 206A operates as the data or forwarding plane for vCSR 20A. CNI 312 leveraging cRPD 324 is thus able to facilitate multi-tenancy using L3VPNs, e.g., to implement network slices for different tenants; ACLs and network policies for applications; and IPSec for high security.

Figure 10:
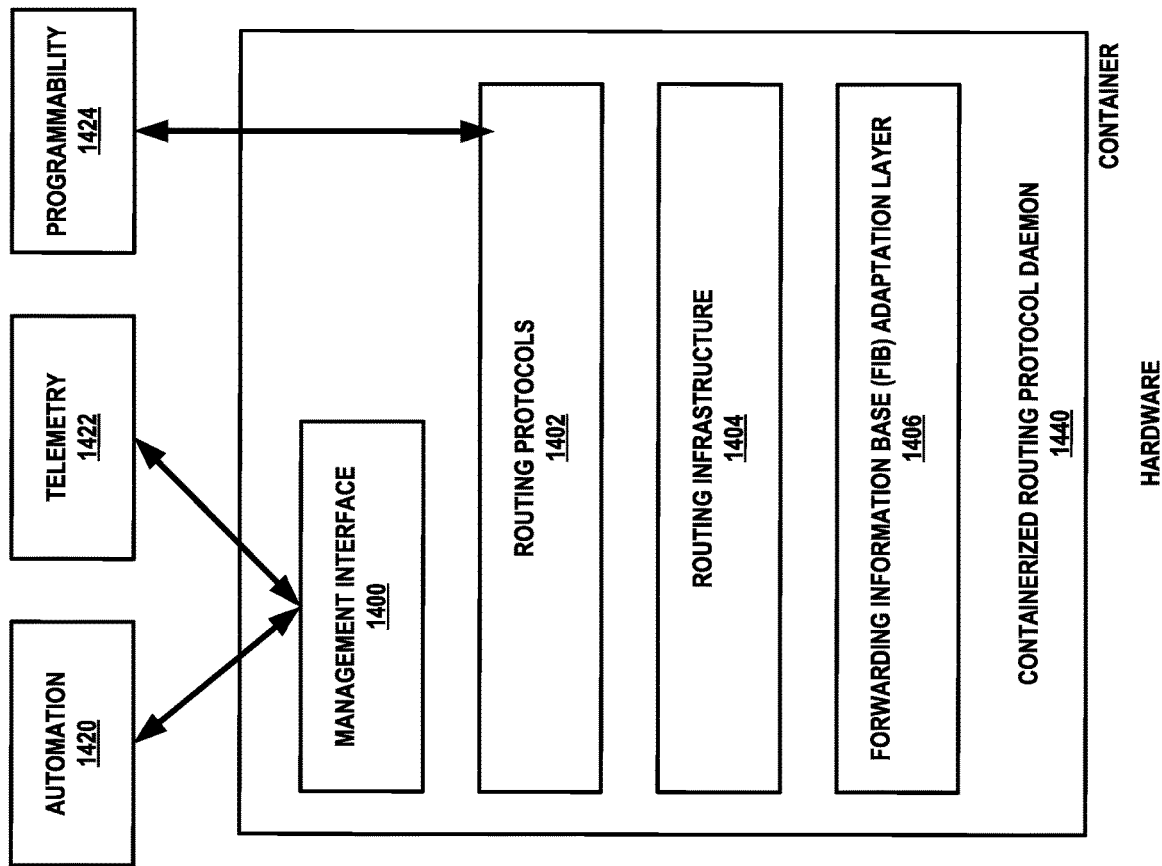
FIG. 10 is a block diagram illustrating an example implementation of an example containerized routing protocol daemon, which an orchestrator may deploy using a pod, according to techniques described in this disclosure.

FIG. 10 is a block diagram illustrating an example implementation of cRPD 324 or any other cRPD of this disclosure, which an orchestrator may deploy using a pod. cRPD 1440 may be deployed as a microservice in Docker, coreOS (rkt), or other container platform.

cRPD 1440 includes management interface 1400, which may represent a command line interface (CLI), Netconf, secure shell (SSH), PCEP, or Simple Network Management Protocol (SNMP) interface. Management interface 1400 may support YANG, OpenConfig, or other configuration data formats. Management interface 1400 may receive configuration data from automation systems 1420 and may output telemetry data to telemetry systems 1422.

cRPD 1440 implements routing protocols 1402, which may include BGP, OSPF, IS-IS, LDP, segment routing, and may receive static routes for programming from a controller or automation system (represented by programmability 1424). cRPD 1440 includes routing infrastructure 1404 to support routing protocols 1402. Routing infrastructure 1404 may include a Routing Information Base (RIB), RIB manager, Label Information Base (LIB), LIB manager. Routing infrastructure 1404 may implement Bidirectional Forwarding Detection (BFD). cRPD 1440 includes a forwarding information base (FIB) adaptation layer (1406) to integrate cRPD 1440 into the data plane by enabling configuring forwarding information in the data plane. For example, FIB adaptation layer 1406 may implement a Netlink or rtsock interface to program a vRouter (e.g., a DPDK-based vRouter). FIB adaptation layer 1406 may implement another type of interface to program a vRouter, kernel-based vSwitch, SmartNIC, network processor, ASIC-based forwarding chips, or other data plane.

FIG. 3B illustrates an example implementation of a server having a disjoint data plane. Kernel 380 may represent a Linux kernel, other Unix-variant kernel, or other operating system kernel that includes a network stack and is capable of packet forwarding.

Server 350 has two data planes for packet forwarding, a first data plane implemented by kernel 380 and a second data plane implemented by vRouter 206A. DPDK-based vRouter 206A is configured with "ownership" of physical interfaces 322. Physical interfaces 322 may be VPN attachment circuits for VRFs 212. Physical interfaces 322 may be associated with respective interfaces of vRouter 206A by which vRouter 206A sends and receives traffic via physical interfaces 322.

In accordance with techniques of this disclosure, vRouter 206A exposes respective interfaces 382 to kernel 380 for physical interfaces 322. That is, for each of physical interfaces, vRouter 206A exposes an interface to kernel 380. Each of interfaces 382 may be a vHost interface. Kernel 380 may therefore send and receive network packets with vRouter 206A via interfaces 382.

In some examples, cRPD 324 runs routing protocols and needs to exchange routing protocol messages with routers external to server 350. Moreover, cRPD 324 relies on the kernel 380 network stack to obtain network topology information for the underlay network, which is needed for cRPD 324 to establish routing protocol adjacencies with the external routers. Interfaces 382 provide access for cRPD 324, via kernel 380 and vRouter 206A, to physical interfaces 322 and thus to the underlay networks accessible via physical interfaces 322. Such underlay networks may include the midhaul network, a switch fabric for a local data center in which server 350 is located, and so forth. vRouter 206A is configured with a route that causes vRouter 206A to forward network packets, received at one of physical interfaces 322 and destined for an IP address of the corresponding one of interfaces 382, via that corresponding one of interfaces 382 to kernel 380.

Kernel 380 outputs the network packets to cRPD 324 via interface 384. Interface 384 may represent system call interfaces/APIs exposed by kernel 380, a file system, pthread, socket, or other mechanism by which processes such as cRPD 324 can receive packets from and inject packets into kernel 380. In this way, cRPD 324 may operate as the control plane for executing routing protocols for virtualized cell site router 20A in a way that incorporates the network stack, routing protocol infrastructure, and other networking features of kernel 380; while vRouter 206A may operate as the data plane for forwarding data traffic between DUs 22A-1-22A-N and physical interfaces 322 in a way that excludes the kernel 380. As a result, because DPDK-based vRouter 206A runs in user space and in general provides better performance capabilities as compared to kernel-based forwarding, these disjoint data planes (kernel 380+vRouter 206A) and (vRouter 206A alone) may provide fast path data packet handling by vRouter 206A as well as full control plane routing functionality for virtualized cell site router 20A.

Figure 6:
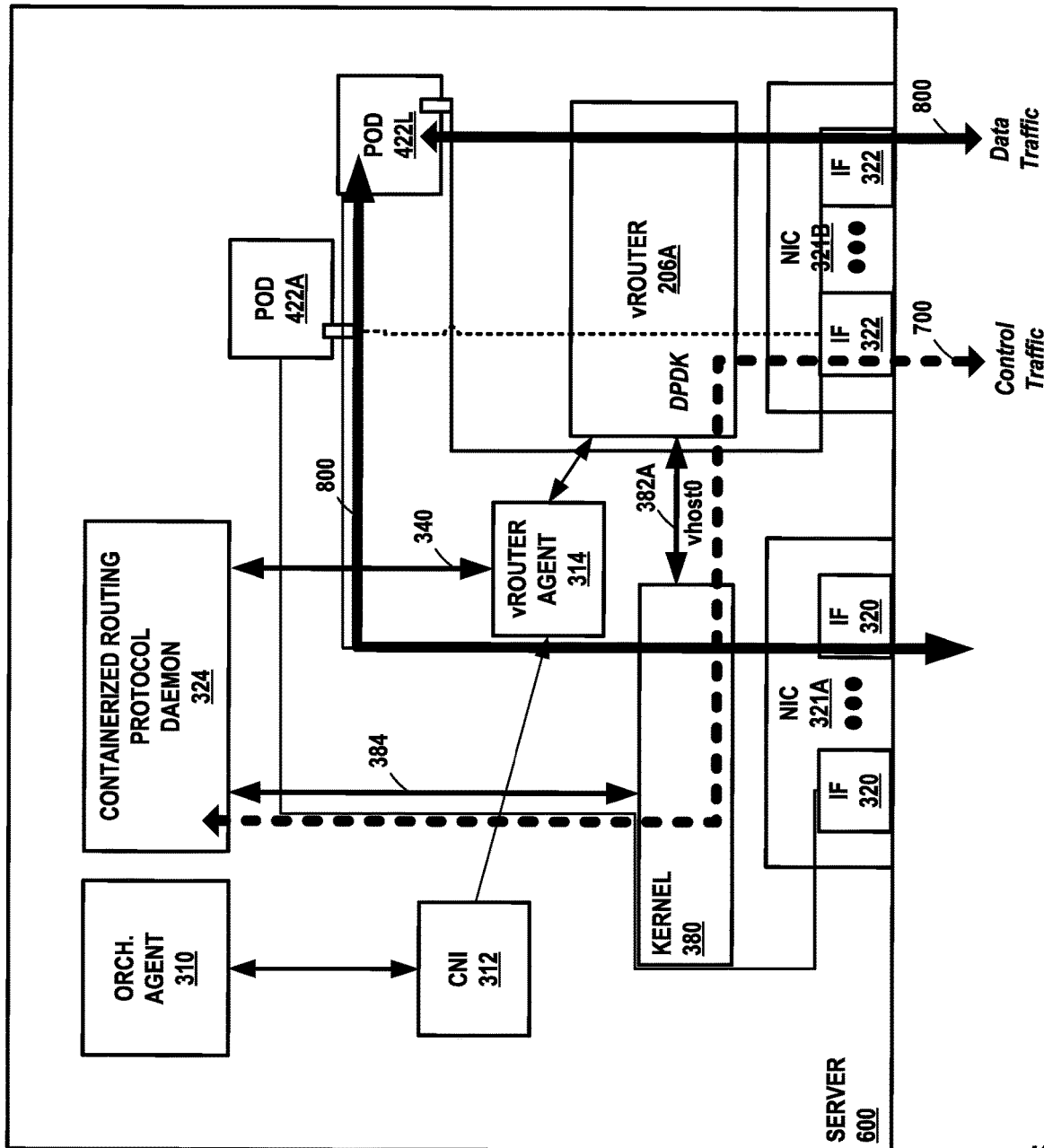
FIG. 6 is a block diagram illustrating an example server with example control and data traffic flows within the server, according to techniques of this disclosure.

FIG. 6 is a block diagram illustrating an example server with example control and data traffic flows within the server, according to techniques of this disclosure. Server 600 may be similar to server 350 of FIG. 3B or other server described herein. Server 600 differs from server 350 in that PODs 422A-422L are not necessarily DUs (e.g., DU microservices), though PODs 422A-422L may be DUs in some cases. cRPD 324 operates as the control plane for a router implemented by server 600 and DPDK-based vRouter 206A operates as the fast path forwarding plane for the router. PODs 422A-422L are endpoints from the perspective of vRouter 206A, and in particular may represents overlay endpoints for one or more virtual networks that have been programmed into vRouter 206A. A single vhost interface, vhost0 interface 382A, may be an example of any of interfaces 328 of FIG. 3B, and is exposed by vRouter 206A to kernel 380 and in some cases by kernel 380 to vRouter 206A. vhost interface 382A has an associated underlay host IP address for receiving traffic "at the host". Thus, kernel 380 may be a network endpoint of the underlay network that includes server 600 as a network device, the network endpoint having the IP address of vhost interface 382A. The application layer endpoint may be cRPD 324 or other process managed by kernel 380.

Underlay networking refers to the physical infrastructure that provides connectivity between nodes (typically servers) in the network. The underlay network is responsible for delivering packets across the infrastructure. Network devices of the underlay use routing protocols to determine IP connectivity. Typical routing protocols used on the underlay network devices for routing purposes are OSPF, IS-IS, and BGP. Overlay networking refers to the virtual infrastructure that provides connectivity between virtual workloads (typically VMs/pods). This connectivity is built on top of the underlay network and permits the construction of virtual networks. The overlay traffic (i.e., virtual networking) is usually encapsulated in IP/MPLS tunnels or other tunnels, which are routed by the underlay network. Overlay networks can run across all or a subset of the underlay network devices and achieve multi-tenancy via virtualization.

Control traffic 700 may represent routing protocol traffic for one or more routing protocols executed by cRPD 324. In server 600, control traffic 700 may be received over a physical interface 322 owned by vRouter 206A. vRouter 206A is programmed with a route for the vhost0 interface 382A host IP address along with a receive next hop, which causes vRouter 206A to send traffic, received at the physical interface 322 and destined to the vhost0 interface 382A host IP address, to kernel 380 via vhost0 interface 382A. From the perspective of cRPD 324 and kernel 380, all such control traffic 700 would appear to come from vhost0 interface 382A. Accordingly, cRPD 324 routes will specify vhost0 interface 382A as the forwarding next hop for the routes. cRPD 324 selectively installs some routes to vRouter agent 314 and the same (or other) routes to kernel 380, as described in further detail below. vRouter agent 314 will receive a forwarding information base (FIB) update corresponding to some routes received by cRPD 324. These routes will point to vHost0 interface 382A and vRouter 206A may automatically translate or map vHost0 interface 382A to a physical interface 322.

As explained above with respect to FIG. 3B, routing information programmed by cRPD 324 can be classified into underlay and overlay. cRPD 324 will install the underlay routes to kernel 380, because cRPD 324 might need that reachability to establish additional protocols adjacencies/sessions with external routers, e.g., BGP multi-hop sessions over reachability provided by IGPs. cRPD 324 supports selective filtering of FIB updates to specific data planes, e.g., to kernel 380 or vRouter 206A using routing policy constructs that allow for matching against RIB, routings instance, prefix, or other property.

Control traffic 700 sent by cRPD 324 to vRouter 206A over vhost0 interface 382A may be sent by vRouter 206A out the corresponding physical interface 322 for vhost0 interface 382A.

As shown, cRPD-based CNI 312 will create the virtual network (here, "pod") interfaces for each of the application pods 422A, 422L on being notified by the orchestrator 50 via orchestration agent 310. One end of a pod interface terminates in a container included in the pod. CNI 312 may request vRouter 206A to start monitoring the other end of the pod interface, and cRPD 324 facilitates traffic from the physical interfaces 322 destined for application containers in DPDK-based pods 422A, 422L to be forwarded using DPDK, exclusively, and without involving kernel 380. The reverse process applies for traffic sourced by pods 422A, 422L.

However, because DPDK-based vRouter 206A manages these the virtual network interfaces for pods 422A, 422L, the virtual network interfaces are not known to kernel 380. Server 600 may use tunnels exclusive to the DPDK forwarding path to send and receive overlay data traffic 800 internally among DPDK-based pods 422A, 422L; vRouter 206A, and NIC 312B.

As such, in server 600, cRPD 324 interfaces with two disjoint data planes: kernel 380 and the DPDK-based vRouter 206A. cRPD 324 leverages the kernel 380 networking stack to setup routing exclusively for the DPDK fast path. The routing information cRPD 324 receives includes underlay routing information and overlay routing information. cRPD 324 runs routing protocols on vHost interface 382A that is visible in kernel 380, and cRPD 324 may install FIB updates corresponding to IGP-learnt routes (underlay routing information) in the kernel 380 FIB. This may enable establishment of multi-hop iBGP sessions to those destinations indicated in such IGP-learnt routes. Again, the cRPD 324 routing protocol adjacencies involve kernel 380 (and vHost interface 382A) because kernel 380 executes the networking stack.

vRouter agent 314 for vRouter 206A notifies cRPD 324A about the application pod interfaces for pods 422A, 422L. These pod interfaces are created by CNI 312 and managed exclusively (i.e., without involvement of kernel 380) by the vRouter agent 314. These pod interfaces are not known to the kernel 380. cRPD 324 may advertise reachability to these pod interfaces to the rest of the network as L3VPN routes including Network Layer Reachability Information (NLRI). In the 5G mobile network context, such L3VPN routes may be stored in VRFs of vRouter 206A for different network slices. The corresponding MPLS routes may be programmed by cRPD 324 only to vRouter 206A, via interface 340 with vRouter agent 314, and not to kernel 380. That is so because the next-hop of these MPLS labels is a pop-and-forward to a pod interface for one of pods 422A, 422L; these interfaces are only visible in vRouter 206A and not kernel 380. Similarly, reachability information received over BGP L3VPN may be selectively programmed by cRPD 324 to vRouter 206A, for such routes are only needed for forwarding traffic generated by pods 422A, 422. Kernel 380 has no application that needs such reachability. The above routes programmed to vRouter 206A constitute overlay routes for the overlay network.

Figure 4:
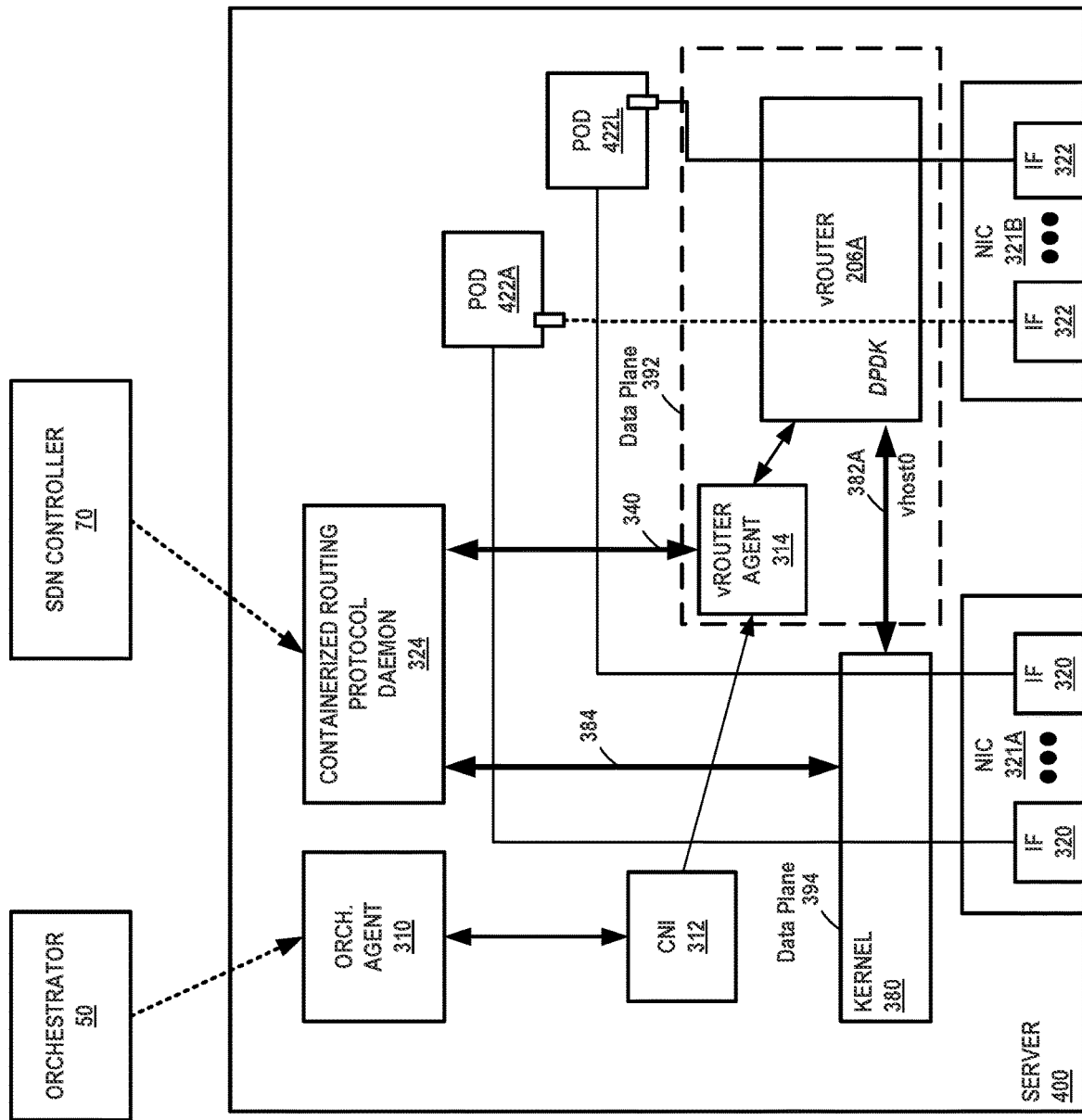
FIG. 4 is a block diagram illustrating an example server according to techniques of this disclosure.

FIG. 4 is a block diagram illustrating an example server according to techniques of this disclosure. Server 400 may be similar to server 600 of FIG. 6. A first data plane 394 includes kernel 380. A second data plane 392 includes vRouter 206A and vRouter agent 314 for vRouter 206A. First data plane 394 and second data plane 392 are disjoint. First data plane 394 and second data plane 392 may store different routes for the underlay network and overlay network, respectively. First data plane 394 and second data plane 392 may independently perform forwarding lookups for and forward traffic using the respective, different stored routes. cRPD 324 is the routing protocol process for processing both underlay routes and overlay routes. Having learned the routes, whether by routing protocols or from SDN controller 70, cRPD 324 can selectively program underlay routes to kernel 380 and overlay routes to vRouter 206A (via vRouter agent 314).

Figure 5:
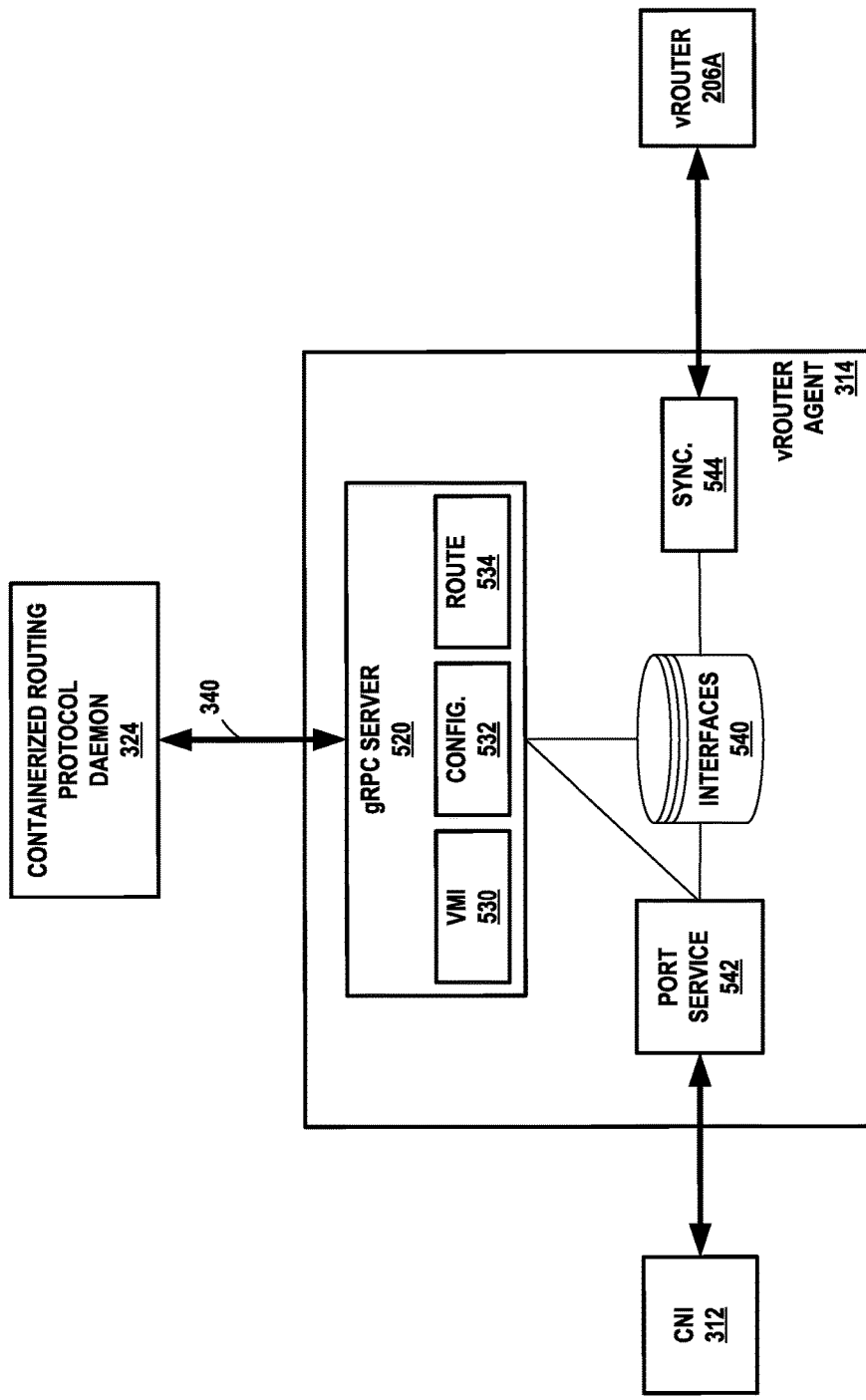
FIG. 5 is a block diagram illustrating an example vRouter agent, according to techniques of this disclosure.

FIG. 5 is a block diagram illustrating an example vRouter agent, according to techniques of this disclosure. vRouter agent 314 includes gRPC server 520 for exchanging data with cRPD 324 (a gRPC client) via a generic interface 340. APIs of gRPC server 520 include virtual machine interface (VMI) APIs 530 for exchanging virtual network interface data and requests, configuration APIs 532 for exchanging configuration data and requests, and route APIs 534 for exchanging routes and requests including for enabling cRPD 324 to program routes to vRouter 206A via vRouter agent 314. Synchronization module 544 programs vRouter 206A with virtual network interfaces (e.g., part of a veth pair or a virtio-vhost interface between a DPDK pod and DPDK-based vRouter 206A) and programs vRouters 206A with routing information.

Interfaces 540 may represent a data structure that stores data describing virtual network interfaces for application pods executing on the server that executes vRouter agent 314. Port service 542 listens for requests from CNI 312, such as request to add new "ports" for application pods, which port service 542 may translate to subscribe requests to cRPD 324 via interface 340 to obtain virtual network interface configuration information from cRPD 324. Port service 542 may be implemented using a REST server.

In this way, vRouter agent 314 provides a generic interface 340 to the data plane for overlay traffic sourced by or destined to application pods on the server. This generic interface 340 may be implemented by any controller, routing protocol process, or other agent because it relies on gRPC rather than a proprietary interface.

The following further describes example implementation details for vRouter 314 of FIG. 5.

In an aspect of the disclosure, a generic data plane model is decoupled from a network controller for virtualized computing infrastructure. For example, a data plane according to this aspect can expose application programming interfaces (APIs) 530, 532, 534 that can be implemented by any control-plane service. In some examples, the data plane will also have the capability to work with multiple types of CNI 312. The data plane may be implemented using a DPDK-based virtual router and expose a gRPC interface 340 for exchanging control data. For instance, a virtual router agent 314 for the virtual router data plane may operate as a gRPC server 520 that exposes gRPC APIs for programming the virtual router data plane 206A. The techniques include workflows for configuring virtual network interfaces for pods, where the virtual router agent 314 obtains the information from a containerized routing protocol daemon (cRPD) 324 in response to a request for a port from CNI 312.

This disclosure describes a generic data plane model that is decoupled from the SDN controller and can expose APIs that can be implemented by any control-plane service, such as vRouter agent 314. The proposed data plane, e.g., vRouter 206A and vRouter agent 314, will also have the capability to work with any CNI. In some cases, the data plane will work with Platter CNI. (Platter is described as another aspect of this disclosure as a set of software components that provides CNI functionality that address networking requirements unique to cloud native 5G network environments. The software components include a containerized routing protocol daemon (cRPD) to support a Network Service Mesh (NSM) architecture. The set of software components support NSM architecture.) Further, solutions that possibly optimize the data plane to be modular and have a smaller footprint will also be considered. The generic data plane proposed here may be an extension to the current contrail based data plane. The design presented will include scope for both a vrouter as well as a dpdk forwarding plane and at the same time will also accommodate the need for supporting upcoming technologies such as eBPF and XDP along with supporting a vRouter and DPDK based forwarding planes. This design will also pave the way for having the same generic data plane work with more than one control plane at the same time. The compute node data plane may therefore become more loosely coupled with the SDN control plane, versus existing control plane and data plane integration schemes. Further, the techniques may relieva legacy openstack or other orchestration-type features that are implemented in existing data planes making such data planes have a large footprint.

In the model for existing data planes, there are two building blocks that implement the data plane—the vRouter agent and the vRouter (or dpdk) forwarding plane. The vRouter agent may be a user space process running on Linux. It acts as the local, lightweight control plane and is responsible for the following functions:

It exchanges control states such as routes with the control nodes using XMPP.

It receives low-level configuration state such as routing instances and forwarding policy from the control nodes using XMPP.

It reports analytics state such as logs, statistics, and events to the analytics nodes.

It installs forwarding state into the forwarding plane.

It discovers the existence and attributes of VMs in cooperation with an orchestration agent.

It applies forwarding policy for the first packet of each new flow and installs a flow entry in the flow table of the forwarding plane.

It proxies DHCP, ARP, DNS, and MDNS. Additional proxies can be included in the future.

Each vRouter agent is connected to at least two control nodes for redundancy in an active-active redundancy model.

The vRouter forwarding plane is existing systems may operate as a loadable kernel module in Linux and is responsible for the following functions:

It enables encapsulating packets to be sent to the overlay network and decapsulating packets to be received from the overlay network.

It assigns packets to a routing instance: Packets received from the overlay network are assigned to a routing instance based on the MPLS label or Virtual Network Identifier (VNI). Virtual interfaces to local virtual machines are bound to routing instances.

It does a lookup of the destination address in the forwarding information base (FIB)—also known as forwarding table—and forwards the packet to the correct destination. The routes can be Layer 3 IP prefixes or Layer 2 MAC addresses.

A forwarding policy can be applied using a flow table: It matches packets against the flow table and applies the flow actions.

It punts the packets for which no flow rule is found (that is, the first packet of every flow) to the vRouter agent, which then installs a rule in the flow table.

It punts certain packets such as DHCP, ARP, MDNS to the vRouter agent for proxying to an SDN controller.

In accordance with techniques of one or more aspects of this disclosure, the vRouter forwarding plane may be implemented using a DPDK-based router, which may present the following properties:

DPDK based forwarding is implemented completely in user space

The virtual router application runs as multiple logical cores

Logical (Lcores) are pthreads with core affinity

Lcores run in poll mode and handle bursts of packets for maximum performance

DPDK provides lockless rings for communicating between Lcores

Highly optimized for Intel architecture

Efficient use of CPU caches

Huge pages to reduce TLB misses

NUMAaware

A generic data plane interface for either type of virtual router to a control plane can be done by enhancing the current model in one of the following ways:

(1) A vRouter Agent+vRouter/DPDK forwarding plane with XMPP northbound interface. Keep the current model as is by using a vRouter Agent as the data plane and have the control plane implement XMPP (as is done by the contrail control-node). However, not all control planes support XMPP and it may not be the preferred approach. The vRouter agent carries a lot of support for legacy openstack features which may not be necessary, leading to a larger footprint.

(2) vRouter Agent+vRouter/DPDK forwarding plane and GRPC northbound interface. Keep the current data plane and forwarding plane but implement a commonly used open-source protocol such as GRPC as the interface to the control plane. Using a more widely adapted protocol such as GRPC as the north-bound interface opens up more opportunities. Control planes are likely to be increase adoption. Still, the vRouter agent carries a lot of support for legacy openstack features which may not be necessary, leading to a larger footprint.

(3) vRouter/DPDK forwarding plane+lean vRouter Agent and GRPC northbound interface. Keep the vRouter/DPDK forwarding plane as is but reduce the footprint of the vRouter agent by only adopting functionality that is strictly required by the forwarding plane. The northbound interface can be either XMPP or preferably GRPC. vRouter agent footprint can be reduced in two ways:

Make the current vRouter agent modular and lean

Implement a new library that will represent the lean agent and have only necessary functionality In this scheme, like (2), using a more widely adapted protocol such as GRPC as the north-bound interface opens up more opportunities and control planes are likely to increase adoption. Further, a lean and modular agent reduces the overall footprint and provides the flexibility to pick and choose features as needed.

(4) vRouter/DPDK forwarding plane+northbound interface (GRPC). Expose the vRouter/DPDK forwarding plane directly to the control plane. This scheme climates the need for a separate vRouter agent, but it loses the current hardware abstraction where the vrouter is shielded from the control plane. Also, the intelligence provided by the vRouter agent has to either be absorbed by the control plane or by the vRouter, making it more complex.

A combination of schemes (2) and (3) may facilitate a generic data plane. In the case of where a vRouter-based data plane may be used in conjunction with a cRPD-based control plane, the proposed architecture will look as shown in FIGS. 3A-3B, and 4-6. As can be seen, there is in these examples a vRouter Agent 314, vRouter/DPDK forwarding plane 206A, and a gRPC northbound interface 340 as the genetic data plane interface. The data plane of vRouter 206A and vRouter agent 314 then becomes "generic" by decoupling the northbound interface from vRouter agent 314 to cRPD 324. In some examples, vRouter 206A and vrouter agent 314 may run in a single container and/or as an independent piece of software. Use of gRPC reduces dependency on any particular control plane. There may be provided support for a gRPC interface as an abstract layer above the vRouter agent 314, an interface to handle config+ routing, a gRPC interface to provide abstraction for config objects, a standard data model for config north bound interface to control plane and translate to Agent understandable format on the south bound interface.

A Port Add and Port Down sequence may be primarily done via cRPD or via a vRouter Agent. Example such sequences for Port Add and Port Down are below:

| CNI - cRPD (Option 1) | CNI - Agent (Option 2) |
|---|---|
| Port Add | Port Add |
| 1. CNI has the IP address block reserved for Pods | 1. CNI has the IP address block reserved for Pods |
| 2. On port-add allocates IP and configures container | 2. On port-add allocates IP and configures container |
| 3. CNI triggers port-add to cRPD with network name and IP address | 3. CNI triggers port-add to Agent with network name and IP address |
| 4. cRPD invokes Agent's VMIAdd with IP and port VRF | 4. Agent sends VMI subscribe to cRPD along with network name and IP |
| 5. Agent acknowledges VMI-Add | 5. cRPD sends VMI-Update to Agent providing VMI's VRF |
| 6. cRPD allocates label and adds Route and NH to Agent | 6. Agent acknowledges VMI update |
| 7. cRPD exports route | 7. cRPD allocates label and adds Route and NH to Agent |
| | 8. cRPD exports route |
| Port Down | Port Down |
| 1. Netlink message generated by vRouter DPDK | 1. DPDK informs Agent |
| 2. cRPD withdraws route/NH | 2. Agent sends VMI-Down to cRPD |
| | 3. cRPD withdraws route/NH |
| Responsibility for route/label add/del and VMI add/del remains at one place | Very similar to the model today used between Controller-Agent |
| Expect future control-planes to come with CNI | No new direct Netlink messages from DPDK needed |

VRFs Vs Overlay Routes in inet.0 or inet.3

In one example aspect, the system supports VRF functionality where overlay and underlay routes remain separated in different VRFs.

Object Formats and Protocol Buffer (WIP)

In gRPC, clients can invoke a method on a server application. Although vRouter Agent 314 is the client in an XMPP model, it is the server according to techniques of this disclosure and invokes functions in the client when it has to push an object.

Separate services are defined for route and config programming. In addition, a separate service is defined for Agent to inform cRPD of port add/delete/down events.

```
service RouteAPI {
  rpc vRouterAPI (stream DPMsg) returns (stream DPMsg) { }
}
service ConfigAPI {
  rpc vRouterAPI (stream DPMsg) returns (stream DPMsg) { }
}
service VMIAPI {
  rpc vRouterAPI (stream DPMsg) returns (stream DPMsg) { }
}
message DPMsg {
  int64 seq_number = 1;
  enum Event {
    ADD = 0;
    DEL = 1;
    CHANGE = 2;
    READ = 3;
  }
  Event event = 1;
  oneof msg {
    VrfRequest vrf_req = 2;
    VMISubscribe vmi_sub = 3;
    VMIConfig vmi_conf = 4;
  RouteRequest rt_req = 4;
  AckMsg ack = 5;
  }
}
message AckMsg {
  Int64 seq_number = 1;
} message VrfRequest {
  string vrf_name = 1;
}
```

Virtual Machine Interface (e.g., Virtual Network Interface)

```
enum VMItype{
  VMI = 0;
  VMI_SUBINTF = 1;
}
message VMISubscribe {
  VMIType vmi_type = 1;
  string vmi_mac = 2;
  string vmi_ip = 3;
  string vmi_ip_6 = 4;
  string network_name = 5;
```

```
        string vmi_name = 6;
        int32 vmi_id = 7;
        int32 vmi_mtu = 7;
}
message VMIConfig {
    VMIType vmi_type = 1;
    string network_name = 2;
    string vmi_vrf_name = 3;
    string vmi_mac = 4;
    string vmi_ip = 5;
    string vmi_ip_6 = 6;
    optional int32 vmi_mtu = 7;
    optional int32 vmi_vlan_id = 8;
    string vmi_name = 9;
    optional int32 vmi_id = 10;
    optional string parent_vmi_id = 11;
    bool policy_enabled = 12;
    enum ForwardingMode{
        L2_ONLY = 0;
        L3_ONLY = 1;
        L2_AND_L3 = 2;
    }
    optional ForwardingMode f_mode = 13;
    optional repeat VMIConfig sub_intfs = 14;
    string acl_name = 15;
}
```

Route/Next-Hop (NH)

```
message RouteRequest {
    int32 route_af = 1;
    optional Int32 route_safi = 2;
    oneof route_data {
        Ipv4Route ipv4_route = 1;
        Ipv6Route ipv6_route = 2;
        EvpnRoute evpn_route = 3;
        MplsRoute mpls_route = 4;
    }
    message Ipv4Route {
        string route_prefix = 1;
        int32 route_prefix_len = 2;
        string route_vrf = 3;
    }
    message Ipv6Route {
        string route_prefix = 1;
        int32 route_prefix_len = 2;
        string route_vrf = 3;
    }
    message EvpnRoute {
        string mac_ip_route = 1;
        string route_vrf = 3;
    }
    message MplsRoute {
        int32 label = 1;
    }
    message attributes {
        message TLV {
            oneof tlv_msg {
                NextHop nh = 1;
            }
        }
        repeated TLV attr = 7;
    }
    message NextHop {
        int32 family = 1;
        enum NHType {
            TABLE = 0;
            INTF = 1;
        }
        optional NHType nh_type = 2
        optional int32 service_label = 4;
        optional int32 vni = 5;
        optional string dst_prefix = 3;
        optional oneof gw {
            optional IntfIdx intf_idx;
            optional string vrf_name;
        }
    }
```

```
        optional oneof encap {
            Encap_SRV6 sr_v6 = 1;
            Encap_SR_MPLS sr_mpls = 2;
            Encap_MPLS mpls= 3;
            Encap_MPLSoGRE mpls_o_gre = 4;
            Encap_MPLSoUDP mpls_o_udp = 5;
            Encap_VxLAN vxlan = 6;
        }
    }
}
message Encap_SR_MPLS {
    repeat uint32 label = 1;
    optional IntfIdx oif = 2;
    optional string src_prefix = 3;
}
message Encap_SRV6 {
    repeat string sid = 1;
    optional IntfIdx oif = 2;
    optional string src_prefix = 3;
}
message Encap_MPLS {
    repeat uint32 label = 1;
}
message Encap_MPLSoGRE {
    optional IntfIdx oif = 1;
    optional string src_prefix = 2;
}
message Encap_MPLSoUDP {
    optional IntfIdx oif = 1;
    optional string src_prefix = 2;
}
message Encap_MPLSoUDP {
    optional IntfIdx oif = 1;
    optional string src_prefix = 2;
}
message IntfIdx {
    bool os_idx = 1;
    int32 intf_idx = 2;
}
```

IPv4 Route 10.10.10.1./32 for a Local VMI

```
message RouteRequest {
    int32 route_af = 1; // IPv4
    route_data {
        Ipv4Route ipv4_route = 1;
            string route_prefix = 1; // 10.10.10.1
            int32 route_prefix_len = 2; // 32
            string route_vrf = 3; // vrf_name
    }
    message attributes {
        TLV attr {
            message NextHop {
                int32 family = 1; // IPv4
                NHType nh_type = 2 // INTF
                string dst_prefix = 3; // 10.10.10.1
                gw {
                    IntfIdx intf_idx;
                        bool os_idx = 1; // false
                        int32 intf_idx = 2; // VMI Index
                }
            }
        }
    }
}
```

MPLS Route for a Local VMI, Label=100

```
message RouteRequest {
    int32 route_af = 1; //MPLS
    route_data {
        MplsRoute mpls_route = 4;
            int32 label = 1; // 100
    }
    message attributes {
        TLV attr {
```

```
message NextHop {
    int32 family = 1; // MPLS
    NHType nh_type = 2; // INTF
    gw {
        IntfIdx intf_idx;
            bool os_idx = 1; // false
            int32 intf_idx = 2; // VMI Index
        }
    }
}
```

Overlay Remote Route 10.10.10.2/32, Service Label 200, DIP 100.100.100.1

```
message RouteRequest {
    int32 route_af = 1; //IPv4
    route_data {
        Ipv4Route ipv4_route = 1;
            string route_prefix = 1; // 10.10.10.2
            int32 route_prefix_len = 2; // 32
            string route_vrf = 3; // Vrf name
    }
    attributes {
        TLV attr = 7;
        message NextHop {
            int32 family = 1; // IPv4
            optional int32 service_label = 4; // 200
            optional string dst_prefix = 3; // 100.100.100.1
            encap {
                Encap_SR_MPLS sr_mpls = 2;
                    repeat uint32 label = 1; // Labels
            }
        }
    }
}
```

Below are example message structures for access control list (ACL) policies.

```
                              ACL
message SGRequest {
    string sg_name = 1;
    repeat PolicyRule sg_rules = 2;
}
message PolicyRule {
    string af = 1;
    string direction = 1,
    string protocol = 2;
    IPAddress src_addr = 3;
    Ports src_ports = 4;
    IPAddress dst_addr = 5;
    Ports dst_ports = 6;
    oneof protomatch {
        ICMPMatch icmp_match = 1,
        TCPMatch tcp_match = 2;
        UDPMatch udp_match = 3;
    }
    Repeat Action action_list = 7;
}
message IPAddress {
    string prefix = 1;
    int32 prefix_len = 2;
}
message Ports {
    int32 start = 1;
    int32 end = 2;
}
message Action {
    oneof rule_action {
        SimpleAction simple_action = 1;
```

```
                              ACL
        MirrorAction mirror_action = 2;
        LogAction log_action = 3;
        HBSAction hbs_action = 4,
        VrfTranslate Action = 5;
        QoS Action = 6;
        AlertAction = 7;
    }
}
message SimpleAction {
    string action = 1;
}
```

Client/Server Model

The server may be implemented with two Completion Queues to work in asynchronous mode—one for the VMI subscribe service 530 and the other for route/config service 532, 534. An abstract class ServiceData may be defined from which individual service data types inherit. The service data objects' addresses may be used as tags added to completion queue for various calls.

```
class ServiceData {
    ...
    Virtual void process( ) = 0,
    ...
}
class RouteApiData :: public ServiceData {
    ...
    void process( ) {
        // Read DPMsg
        AgentWorkQueue.Enqueue(dpmsg_);
        responder_.Read(&request_ this);
    }
    ...
}
class ConfigApiData :: public ServiceData {
    ...
    void process( ) {
        AgentWorkQueue.Enqueue(request_);
        responder_.Read(&request_, this);
    }
    ...
}
class VmiApiData :: public ServiceData {
    ...
    void process( ) {
        if (state_ == WRITE_VMI)
        responder_.Write(&reply_, this);
            state_ = WRITE_CALLED;
        } else if (state_ == WRITE_CALLED) {
        }
    ...
}
class ServerImpl final {
    ...
    void Run( ) {
        ...
        HandleRpcs( );
    }
    void HandleRpcs( ) {
        new CallData(&service_, cq_.get( ));
        void* tag;
        while (true) {
        GPR_ASSERT(cq_->Next(&tag, &ok));
        static_cast<SerivceData*>(tag)->Process( );
        }
    }
}
```

Figure 7:
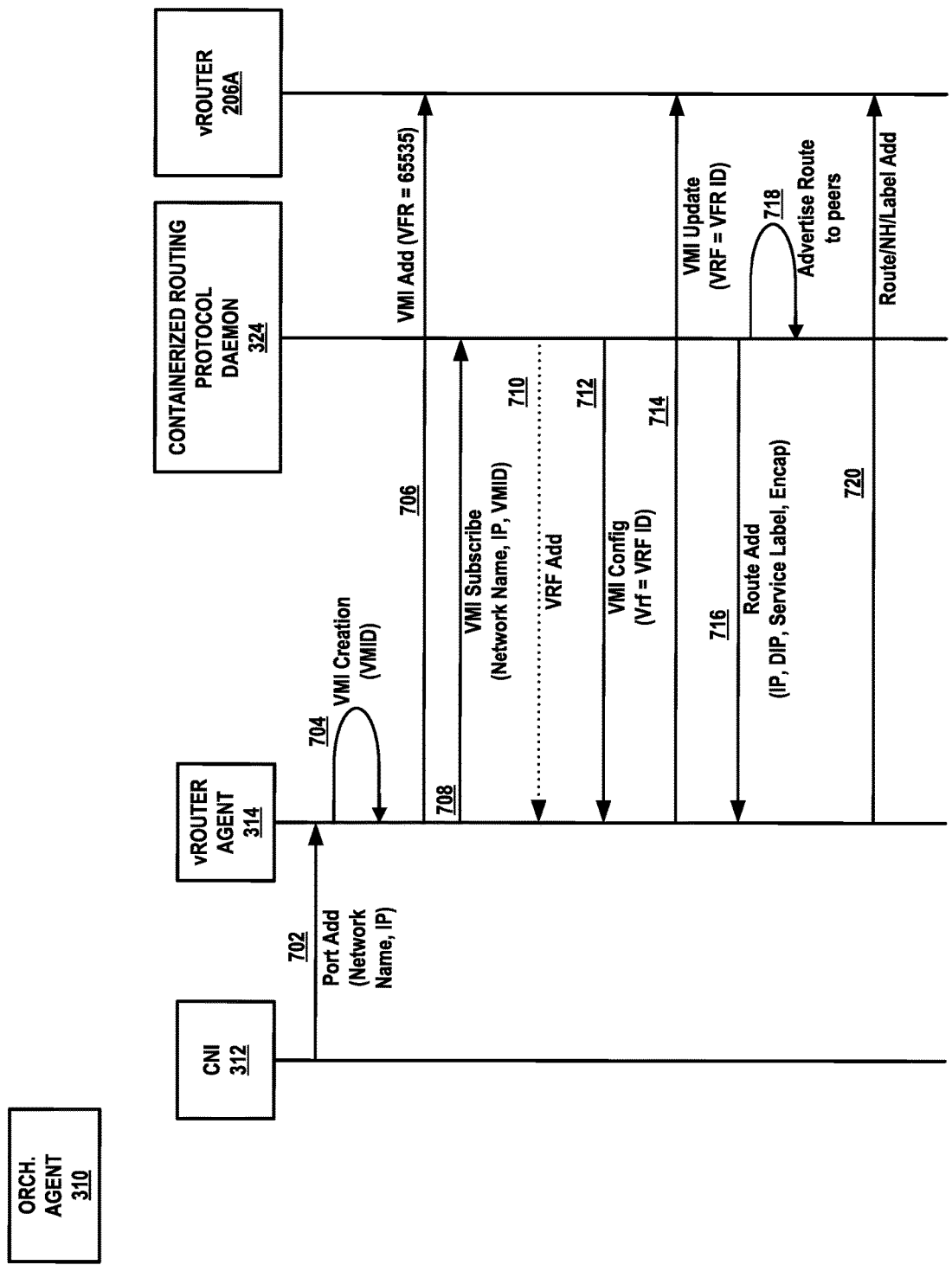
FIG. 7 is a conceptual diagram depicting a sequence of operations on a port-add leading to route programming in a vRouter, according to example aspects of this disclosure.

FIG. 7 is a conceptual diagram depicting a sequence of operations on a port-add leading to route programming in a vRouter, according to example aspects of this disclosure. The sequence of operations is described with respect to components of server 300, but may be performed by components of any server described in this disclosure, e.g., servers 12, 350, 400, 600. The sequence of operations in FIG. 7 may be similar to operations of CNI—Agent (Option 2) described above. CNI 312 has the IP address block reserved for Pods. vRouter agent 314 listens for Port-Add and Port-Delete messages, e.g., on a thrift service, where a "port" corresponds to a virtual network interface. CNI 312 sends a Port-Add message to vRouter agent 314 (702). The Port-Add message includes an identifier for the virtual network for the port and an IP address allocated by CNI 312 for the Pod. (CNI 312 may separately configure the Pod with the other end of the virtual network interface.) vRouter agent 314 creates a virtual network interface (referred to here as a virtual machine interface or VMI, which is an example of a virtual network interface) in interfaces 540 (704). vRouter agent 314 configures the virtual network interface in vRouter 206A with a default VRF identifier, with a VMI Add message (706). vRouter agent 314 subscribes to cRPD 324 instead of an SDN controller with a VMI Subscribe message that includes the virtual network name and IP address received in the Port Add message (708). cRPD 327 sends a VMI Config message to vRouter agent 314 with the correct VRF identifier for virtual network for the virtual network interface (712), optionally adding a VRF to vRouter agent 314 if needed with a VRF Add message (710). vRouter agent 314 send a VMI Update message with the correct VRF identifier to vRouter 206A to cause vRouter 206A, which attaches the virtual network interface to the correct VRF (714). cRPD 324 allocates a service label and adds a route and next-hop (e.g., an MPLS route for BGP IP-VPNs) using a Route Add message to vRouter agent 314 (716). cRPD 324 also advertises a route for reaching the Pod to its peer routers (718), which may include other cRPDs, routers in the underlay network, or other routers. vRouter agent 314 configures vRouter 206A with forwarding information for the route received in the Route Add message from cRPD 324 (720). Examples message structures and data structures for messages described with respect to FIG. 7 are defined above.

Figure 11:
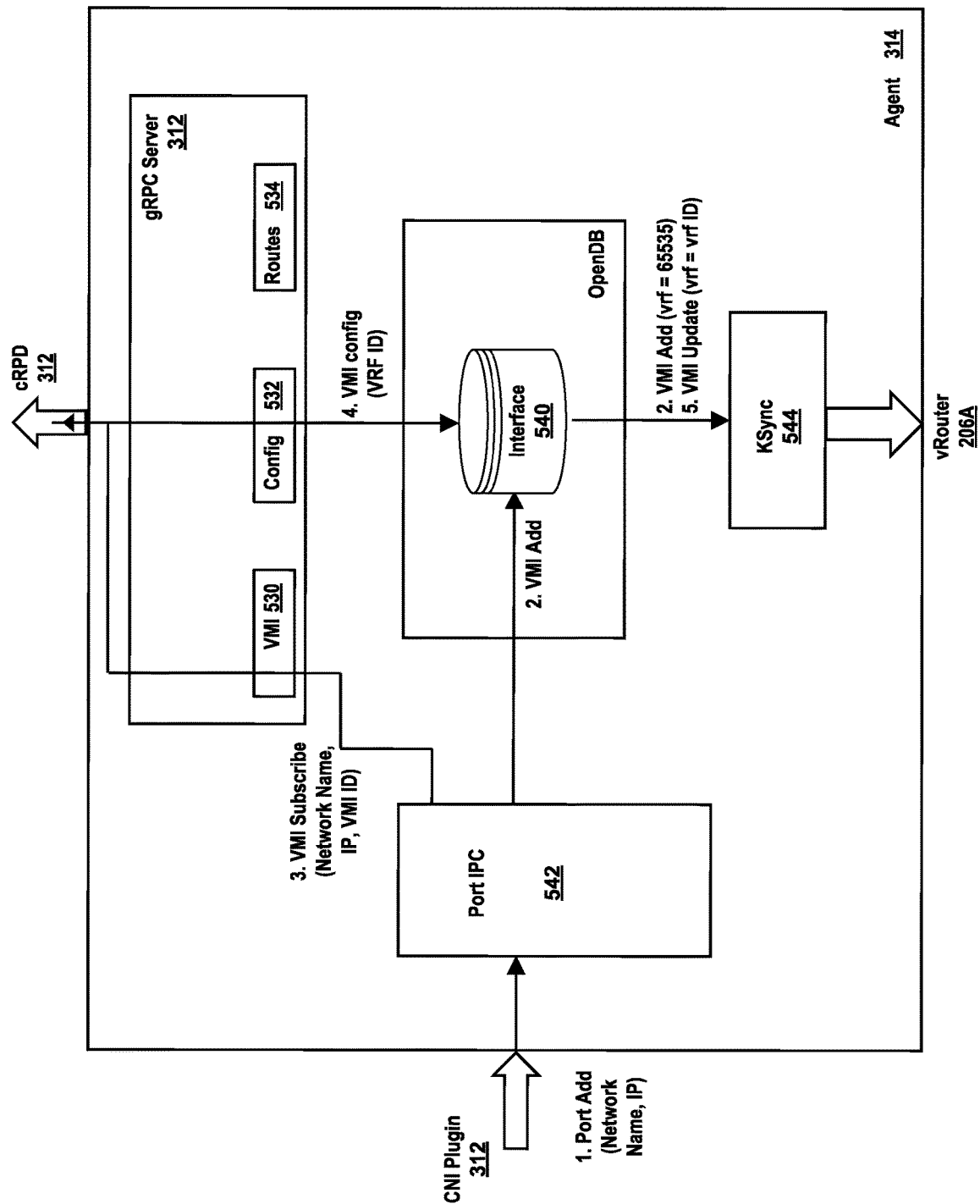
FIG. 11 is a block diagram illustrating example components of a virtual router agent and an example sequence of operations and messages to create and advertise a new port for a Pod, in accordance with techniques of this disclosure.

FIG. 11 is a block diagram illustrating example components of a virtual router agent and an example sequence of operations and messages to create and advertise a new port for a Pod, in accordance with techniques of this disclosure. The example sequence may be similar in some respects to that described with respect to FIG. 7.

Figure 8:
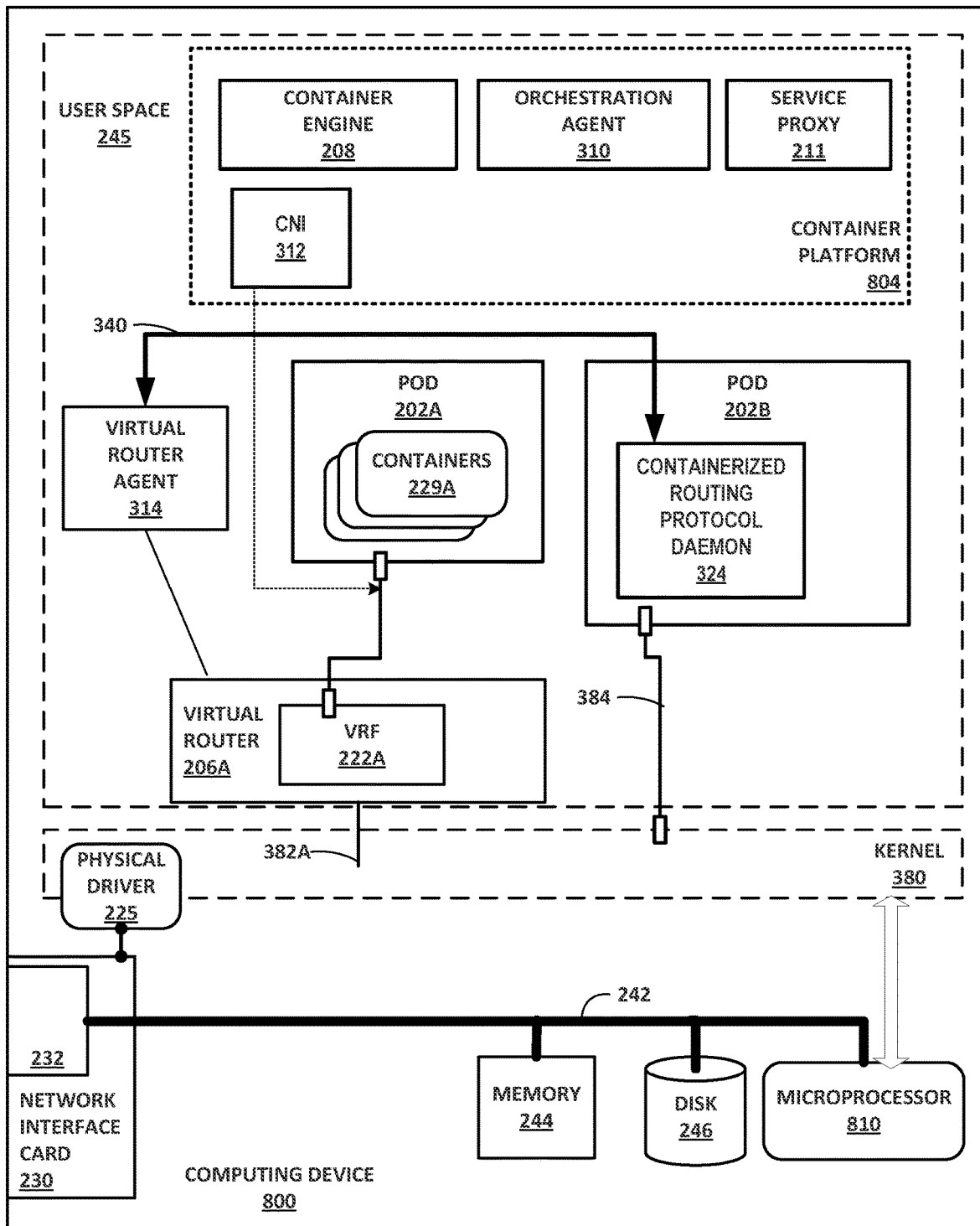
FIG. 8 is a block diagram of an example computing device (e.g., host), according to techniques described in this disclosure.

FIG. 8 is a block diagram of an example computing device (e.g., host), according to techniques described in this disclosure. Computing device 800 of FIG. 2 may represent a real or virtual server and may represent an example instance of any of servers 12 of FIG. 1, or servers 350 or 400. Computing device 800 includes in this example, a bus 242 coupling hardware components of a computing device 800 hardware environment. Bus 242 couples network interface card (NIC) 230, storage disk 246, and one or more microprocessors 210 (hereinafter, "microprocessor 810"). NIC 230 may be SR-IOV-capable. A front-side bus may in some cases couple microprocessor 810 and memory device 244. In some examples, bus 242 may couple memory device 244, microprocessor 810, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 810 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 810.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 810 may provide an operating environment for a software stack that includes an operating system kernel 380 executing in kernel space. Kernel 380 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 380 provides an execution environment for one or more processes in user space 245.

Kernel 380 includes a physical driver 225 to use the network interface card 230. Network interface card 230 may also implement SR-IOV to enable sharing the physical network function (I/O) among one or more virtual execution elements, such as containers 229A-229B or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 800 may be coupled to a physical network switch fabric that includes an overlay network that extends switch fabric from physical switches to software or "virtual" routers of physical servers coupled to the switch fabric, including virtual router 206A. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 800 of FIG. 2, virtual router 206A executes within user space as a DPDK-based virtual router, but virtual router 206A may execute within a hypervisor, a host operating system, a host application, or a virtual machine in various implementations.

Virtual router 206A may replace and subsume the virtual routing/bridging functionality of the Linux bridge/OVS module that is commonly used for Kubernetes deployments of pods 202. Virtual router 206A may perform bridging (e.g., E-VPN) and routing (e.g., L3VPN, IP-VPNs) for virtual networks. Virtual router 206A may perform networking services such as applying security policies, NAT, multicast, mirroring, and load balancing.

Virtual router 206A can be executing as a kernel module or as a user space DPDK process (virtual router 206A is shown here in user space 245). Virtual router agent 314 may also be executing in user space. In the example computing device 800 of FIG. 2, virtual router 206A executes within user space as a DPDK-based virtual router, but virtual router 206A may execute within a hypervisor, a host operating system, a host application, or a virtual machine in various implementations. Virtual router agent 314 has a connection to network controller 24 using a channel, which is used to download configurations and forwarding information. Virtual router agent 314 programs this forwarding state to the virtual router data (or "forwarding") plane represented by virtual router 206A. Virtual router 206A and virtual router agent 314 may be processes.

Virtual router 206A may replace and subsume the virtual routing/bridging functionality of the Linux bridge/OVS module that is commonly used for Kubernetes deployments of pods 202. Virtual router 206A may perform bridging (e.g., E-VPN) and routing (e.g., L3VPN, IP-VPNs) for virtual networks. Virtual router 206A may perform networking services such as applying security policies, NAT, multicast, mirroring, and load balancing.

Virtual router 206A may be multi-threaded and execute on one or more processor cores. Virtual router 206A may include multiple queues. Virtual router 206A may implement a packet processing pipeline. The pipeline can be stitched by the virtual router agent 314 from the simplest to the most complicated manner depending on the operations to be applied to a packet. Virtual router 206A may maintain multiple instances of forwarding bases. Virtual router 800 may access and update tables using RCU (Read Copy Update) locks.

To send packets to other compute nodes or switches, virtual router 206A uses one or more physical interfaces 232. In general, virtual router 206A exchanges overlay packets with workloads, such as VMs or pods 202 (in FIG. 2). Virtual router 206A has multiple virtual network interfaces (e.g., vifs). These interfaces may include the kernel interface, vhost0, for exchanging packets with the host operating system; an interface with virtual router agent 314, pkt0, to obtain forwarding state from the network controller and to send up exception packets. There may be one or more virtual network interfaces corresponding to the one or more physical network interfaces 232.

Other virtual network interfaces of virtual router 206A are for exchanging packets with the workloads. Virtual network interfaces 212, 213 of virtual router 206A are illustrated in FIG. 2. Virtual network interfaces 212, 213 may be any of the aforementioned types of virtual interfaces. In some cases, virtual network interfaces 212, 213 are tap interfaces.

In a kernel-based deployment of virtual router 206A (not shown), virtual router 206A is installed as a kernel module inside the operating system. Virtual router 206A registers itself with the TCP/IP stack to receive packets from any of the desired operating system interfaces that it wants to. The interfaces can be bond, physical, tap (for VMs), veth (for containers) etc. Virtual router 206A in this mode relies on the operating system to send and receive packets from different interfaces. For example, the operating system may expose a tap interface backed by a vhost-net driver to communicate with VMs. Once virtual router 206A registers for packets from this tap interface, the TCP/IP stack sends all the packets to it. Virtual router 206A sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 206A (shown in FIG. 2), virtual router 206A is installed as a user space 245 application that is linked to the DPDK library. This may lead to faster performance than a kernel-based deployment, particularly in the presence of high packet rates. The physical interfaces 232 are used by the poll mode drivers (PMDs) of DPDK rather the kernel's interrupt-based drivers. The registers of physical interfaces 232 may be exposed into user space 245 in order to be accessible to the PMDs; a physical interface 232 bound in this way is no longer managed by or visible to the host operating system, and the DPDK-based virtual router 206A manages the physical interface 232. This includes packet polling, packet processing, and packet forwarding. In other words, user packet processing steps are performed by the virtual router 206A DPDK data plane. The nature of this "polling mode" makes the virtual router 206A DPDK data plane packet processing/forwarding much more efficient as compared to the interrupt mode when the packet rate is high. There are comparatively few interrupts and context switching during packet I/O, compared to kernel-mode virtual router 206A, and interrupt and context switching during packet I/O may in some cases be avoided altogether.

In general, each of pods 202A-202B may be assigned one or more virtual network addresses for use within respective virtual networks, where each of the virtual networks may be associated with a different virtual subnet provided by virtual router 206A. Pod 202B may be assigned its own virtual layer three (L3) IP address, for example, for sending and receiving communications but may be unaware of an IP address of the computing device 800 on which the pod 202B. The virtual network address may thus differ from the logical address for the underlying, physical computer system, e.g., computing device 800.

Computing device 800 includes a virtual router agent 314 that controls the overlay of virtual networks for computing device 800 and that coordinates the routing of data packets within computing device 800. In general, virtual router agent 314 communicates with network controller 24 for the virtualization infrastructure, which generates commands to create virtual networks and configure network virtualization endpoints, such as computing device 800 and, more specifically, virtual router 206A, as a well as virtual network interface 212. By configuring virtual router 206A based on information received from network controller 24, virtual router agent 314 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 229A-229B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 206A. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 206A performs tunnel encapsulation/decapsulation for packets sourced by/destined to any containers of pods 202, and virtual router 206A exchanges packets with pods 202 via bus 242 and/or a bridge of NIC 230.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 206A implements one or more virtual routing and forwarding instances (VRFs) 222A-222B for respective virtual networks for which virtual router 206A operates as respective tunnel endpoints. In general, each VRF 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222 may include a network forwarding table storing routing and forwarding information for the virtual network.

NIC 230 may receive tunnel packets. Virtual router 206A processes the tunnel packet to determine, from the tunnel encapsulation header, the virtual network of the source and destination endpoints for the inner packet. Virtual router 206A may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212. VRF 222A forwards the inner packet via virtual network interface 212 to POD 202A in response.

Containers 229A may also source inner packets as source virtual network endpoints. Container 229A, for instance, may generate a layer 3 inner packet destined for a destination virtual network endpoint that is executed by another computing device (i.e., not computing device 800) or for another one of containers. Container 229A may sends the layer 3 inner packet to virtual router 206A via virtual network interface 212 attached to VRF 222A.

Virtual router 206A receives the inner packet and layer 2 header and determines a virtual network for the inner packet. Virtual router 206A may determine the virtual network using any of the above-described virtual network interface implementation techniques (e.g., macvlan, veth, etc.). Virtual router 206A uses the VRF 222A corresponding to the virtual network for the inner packet to generate an outer header for the inner packet, the outer header including an outer IP header for the overlay tunnel and a tunnel encapsulation header identifying the virtual network. Virtual router 206A encapsulates the inner packet with the outer header. Virtual router 206A may encapsulate the tunnel packet with a new layer 2 header having a destination layer 2 address associated with a device external to the computing device 800, e.g., a TOR switch 16 or one of servers 12. If external to computing device 800, virtual router 206A outputs the tunnel packet with the new layer 2 header to NIC 230 using physical function 221. NIC 230 outputs the packet on an outbound interface. If the destination is another virtual network endpoint executing on computing device 800, virtual router 206A routes the packet to the appropriate one of virtual network interfaces 212, 213.

In some examples, a controller for computing device 800 (e.g., network controller 24 of FIG. 1) configures a default route in each of pods 202 to cause the virtual machines 224 to use virtual router 206A as an initial next hop for outbound packets. In some examples, NIC 230 is configured with one or more forwarding rules to cause all packets received from virtual machines 224 to be switched to virtual router 206A.

Pod 202A includes one or more application containers 229A. Pod 202B includes an instance of cRPD 324. Container platform 804 includes container runtime 208, orchestration agent 310, service proxy 211, and CNI 312.

Container engine 208 includes code executable by microprocessor 810. Container runtime 208 may be one or more computer processes. Container engine 208 runs containerized applications in the form of containers 229A-229B. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from controller agent 310, container engine 208 may obtain images and instantiate them as executable containers in pods 202A-202B.

Service proxy 211 includes code executable by microprocessor 810. Service proxy 211 may be one or more computer processes. Service proxy 211 monitors for the addition and removal of service and endpoints objects, and it maintains the network configuration of the computing device 800 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 804 does not include a service proxy 211 or the service proxy 211 is disabled in favor of configuration of virtual router 206A and pods 202 by CNI 312.

Orchestration agent 310 includes code executable by microprocessor 810. Orchestration agent 310 may be one or more computer processes. Orchestration agent 310 may represent a kubelet for a minion node of a Kubernetes cluster. Orchestration agent 310 is an agent of an orchestrator, e.g., orchestrator 23 of FIG. 1, that receives container specification data for containers and ensures the containers execute by computing device 800. Container specification data may be in the form of a manifest file sent to orchestration agent 310 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 202 of containers 229. Based on the container specification data, orchestration agent 310 directs container engine 208 to obtain and instantiate the container images for containers 229, for execution of containers 229 by computing device 800.

Orchestration agent 310 instantiates or otherwise invokes CNI 312 to configure one or more virtual network interfaces for each of pods 202. For example, orchestration agent 310 receives a container specification data for pod 202A and directs container engine 208 to create the pod 202A with containers 229A based on the container specification data for pod 202A. Orchestration agent 310 also invokes the CNI 312 to configure, for pod 202A, virtual network interface for a virtual network corresponding to VRFs 222A. In this example, pod 202A is a virtual network endpoints for a virtual network corresponding to VRF 222A.

CNI 312 may obtain interface configuration data for configuring virtual network interfaces for pods 202. Virtual router agent 314 operates as a virtual network control plane module for enabling network controller 24 to configure virtual router 206A. Unlike the orchestration control plane (including the container platforms 804 for minion nodes and the master node(s), e.g., orchestrator 23), which manages the provisioning, scheduling, and managing virtual execution elements, a virtual network control plane (including network controller 24 and virtual router agent 314 for minion nodes) manages the configuration of virtual networks implemented in the data plane in part by virtual routers 206A of the minion nodes. Virtual router agent 314 communicates, to CNI 312, interface configuration data for virtual network interfaces to enable an orchestration control plane element (i.e., CNI 312) to configure the virtual network interfaces according to the configuration state determined by the network controller 24, thus bridging the gap between the orchestration control plane and virtual network control plane. In addition, this may enable a CNI 312 to obtain interface configuration data for multiple virtual network interfaces for a pod and configure the multiple virtual network interfaces, which may reduce communication and resource overhead inherent with invoking a separate CNI 312 for configuring each virtual network interface.

Figure 9:
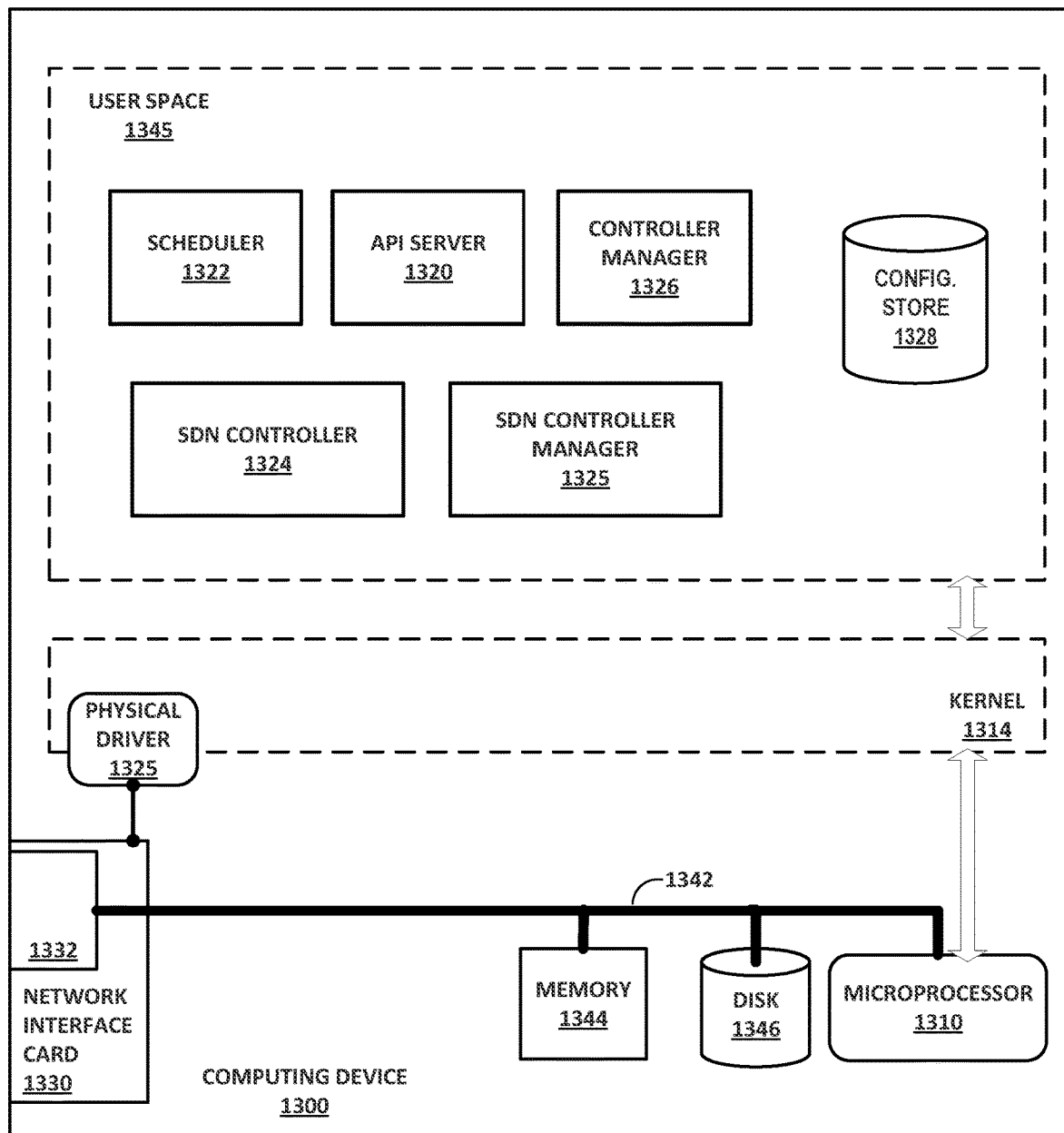
FIG. 9 is a block diagram of an example computing device operating as an instance of an orchestrator master node for a cluster for a virtualized computing infrastructure, according to techniques described in this disclosure.

FIG. 9 is a block diagram of an example computing device operating as an instance of an orchestrator master node for a cluster for a virtualized computing infrastructure. Computing device 300 of FIG. 9 may represent one or more real or virtual servers. As such, computing device 300 may in some instances implement one or more master nodes for respective clusters.

Scheduler 1322, API server 1320, network controller manager 1326, network controller 1324, network controller manager 1325, and configuration store 1328, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of scheduler 1322, API server 1320, network controller manager 1326, network controller 1324, network controller manager 1325, or configuration store 1328. Network controller 1324 may represent an example instance of network controller 24 of FIG. 1. Scheduler 1322, API server 1320, controller manager 1326, and network controller manager 1325 may implement an example instance of orchestrator 23. Network controller manager 1325 may represent an example implementation of a Kubernetes cloud controller manager or Kube-manager. Network controller 1324 may represent an example instance of network controller 24.

Computing device 300 includes in this example, a bus 1342 coupling hardware components of a computing device 300 hardware environment. Bus 1342 couples network interface card (NIC) 1330, storage disk 1346, and one or more microprocessors 1310 (hereinafter, "microprocessor 1310"). A front-side bus may in some cases couple microprocessor 1310 and memory device 1344. In some examples, bus 1342 may couple memory device 1344, microprocessor 1310, and NIC 1330. Bus 1342 may represent a Peripheral Component Interface (PCI) express (PCIe) bus. In some examples, a direct memory access (DMA) controller may control DMA transfers among components coupled to bus 242. In some examples, components coupled to bus 1342 control DMA transfers among components coupled to bus 1342.

Microprocessor 1310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 1346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 1310.

Main memory 1344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 1344 provides a physical address space composed of addressable memory locations.

Network interface card (NIC) 1330 includes one or more interfaces 3132 configured to exchange packets using links of an underlying physical network. Interfaces 3132 may include a port interface card having one or more network ports. NIC 1330 may also include an on-card memory to, e.g., store packet data. Direct memory access transfers between the NIC 1330 and other devices coupled to bus 1342 may read/write from/to the NIC memory.

Memory 1344, NIC 1330, storage disk 1346, and microprocessor 1310 may provide an operating environment for a software stack that includes an operating system kernel 1314 executing in kernel space. Kernel 1314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 1314 provides an execution environment for one or more processes in user space 1345. Kernel 1314 includes a physical driver 1325 to use the network interface card 230.

Computing device 300 may be coupled to a physical network switch fabric that includes an overlay network that extends switch fabric from physical switches to software or "virtual" routers of physical servers coupled to the switch fabric, such virtual router 220 of FIG. 2. Computing device 300 may use one or more dedicated virtual networks to configure minion nodes of a cluster.

API server 1320, scheduler 1322, controller manager 1326, and configuration store may implement a master node for a cluster and be alternatively referred to as "master components." The cluster may a Kubernetes cluster and the master node a Kubernetes master node, in which case the master components are Kubernetes master components.

API server 1320 includes code executable by microprocessor 1310. API server 1320 may be one or more computer processes. API server 1320 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 1320 may implement a Representational State Transfer (REST) interface to process REST operations and provide the frontend to a corresponding cluster's shared state stored to configuration store 1328. API server 1320 may authenticate and authorize requests. API server 1320 communicates with other components to instantiate virtual execution elements in the computing infrastructure 8. API server 1320 may represent a Kubernetes API server.

Configuration store 1328 is a backing store for all cluster data. Cluster data may include cluster state and configuration data. Configuration data may also provide a backend for service discovery and/or provide a locking service. Configuration store 1328 may be implemented as a key value store. Configuration store 1328 may be a central database or distributed database. Configuration store 1328 may represent an etcd store. Configuration store 1328 may represent a Kubernetes configuration store.

Scheduler 1322 includes code executable by microprocessor 1310. Scheduler 1322 may be one or more computer processes. Scheduler 1322 monitors for newly created or requested virtual execution elements (e.g., pods of containers) and selects a minion node on which the virtual execution elements are to run. Scheduler 1322 may select a minion node based on resource requirements, hardware constraints, software constraints, policy constraints, locality, etc. Scheduler 1322 may represent a Kubernetes scheduler.

In general, API server 1320 may invoke the scheduler 1322 to schedule a virtual execution element, which may select a minion node and returns an identifier for the selected minion node to API server 1320, which may write the identifier to the configuration store 1328 in association with the virtual execution element. API server 1320 may invoke the orchestration agent 310 for the selected minion node, which may cause the container engine 208 for the selected minion node to obtain the virtual execution element from a storage server and create the virtual execution element on the minion node. The orchestration agent 310 for the selected minion node may update the status for the virtual execution element to the API server 1320, which persists this new state to the configuration store 1328. In this way, computing device 300 instantiates new virtual execution elements in the computing infrastructure 8.

Controller manager 1326 includes code executable by microprocessor 1310. Controller manager 1326 may be one or more computer processes. Controller manager 1326 may embed the core control loops, monitoring a shared state of a cluster by obtaining notifications from API Server 1320. Controller manager 1326 may attempt to move the state of the cluster toward the desired state. Example controllers (not shown) managed by the controller manager 1326 may include a replication controller, endpoints controller, namespace controller, and service accounts controller. Controller manager 1326 may perform lifecycle functions such as namespace creation and lifecycle, event garbage collection, terminated pod garbage collection, cascading-deletion garbage collection, node garbage collection, etc. Controller manager 1326 may represent a Kubernetes Controller Manager for a Kubernetes cluster.

Network controller 1324 includes code executable by microprocessor 1310. Network controller 1324 may include one or more computer processes. Network controller 1324 may represent an example instance of network controller 24 of FIG. 1. The network controller 1324 may be a logically centralized but physically distributed Software Defined Networking (SDN) controller that is responsible for providing the management, control, and analytics functions of a virtualized network. In particular, network controller 1324 may be a logically centralized control plane and management plane of the computing infrastructure 8 and orchestrates vRouters for one or more minion nodes.

Network controller 1324 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

Network controller 1324 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization.

Network controller 1324 programs network infrastructure elements to create virtual networks and may create interface configurations for virtual network interfaces for the virtual networks.

Additional information regarding an example network controller is found in International Application Number PCT/US2013/044378 and in U.S. patent application Ser. No. 14/226,509, incorporated by reference above.

Network controller manager 1325 includes code executable by microprocessor 1310. Network controller manager 1325 may be one or more computer processes. Network controller manager 1325 operates as an interface between the orchestration-oriented elements (e.g., scheduler 1322, API server 1320, controller manager 1326, and configuration store 1328) and network controller 1324. In general, network controller manager 1325 monitors the cluster for new objects (e.g., pods and services). Network controller manager 1325 may isolate pods in virtual networks and connect pods with services.

Network controller manager 1325 may be executed as a container of the master node for a cluster. In some cases, using network controller manager 1325 enables disabling the service proxies of minion nodes (e.g., the Kubernetes kube-proxy) such that all pod connectivity is implemented using virtual routers, as described herein.

Network controller manager 1325 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 1325 may create a network solution for the application using an interface to network controller 1324 to define network objects such as virtual networks, virtual network interfaces, and access control policies. Network controller 1324 may implement the network solution in the computing infrastructure by, e.g., configuring the one or more virtual network and virtual network interfaces in the virtual routers.

The following example deployment configuration for this application consists of a pod and the virtual network information for the pod:

```
apiVersion: v1
kind: Pod
metadata:
    name: multi-net-pod
    annotations:
        networks: '[
            { "name": "red-network" },
            { "name": "blue-network" },
            { "name": "default/extns-network" }
        ]'
spec:
    containers:
    - image: busybox
      command:
        - sleep
        - "3600"
      imagePullPolicy: IfNotPresent
      name: busybox
      stdin: true
      tty: true
restartPolicy: Always
```

This metadata information is copied to each pod replica created by the controller manager 1326. When the network controller manager 1325 is notified of these pods, network controller manager 1325 may create virtual networks as listed in the annotations ("red-network", "blue-network", and "default/extns-network" in the above example) and create, for each of the virtual networks, a virtual network interface per-pod replica (e.g., pod 202A) with a unique private virtual network address from a cluster-wide address block (e.g. 10.0/16) for the virtual network.

Additional techniques in accordance with this disclosure are described below. Contrail is an example network controller architecture. Contrail CNI may be a CNI developed for Contrail. A Contrail controller may be an example of an SDN controller described in this disclosure, such as SDN controller 50.

Below are additional details of control plane and data plane operations of a server, in accordance with techniques of this disclosure. These details may be implemented in server 600 of FIG. 6, for instance.

As part of the use case for vCSRs, vCSRs 20 may support IPv6 in underlay along with SR-MPLS over IPv6 Tunnels on the vRouters 206. The cRPD 324 control plane traffic e.g.: OSPF, ISIS, etc may be routed using the IPv6 underlay support provided by vRouters 206. The overlay traffic coming from the user Pods may be routed by vRouters 206 over SR-MPLSoIPv6 or other tunnels. The overlay traffic may be identified using the L3VPN Service Label (programmed by cRPDs 24). The SR-MPLS tunnel may be represented using a 'label stack' programmed by cRPDs 24.

In server 600 of FIG. 6, virtual network interfaces for Pods 422 to vRouter 206A may be virtio-host interfaces for separate VRFs configured in vRouter 206A. vRouter agent 314 and vRouter 206A may be configured with multiple interfaces for communicating with each other: a pkt0 interface and a Unix domain socket (e.g., Sandesh). vHost0 382A is described elsewhere in this disclosure. The cRPD 324 control plane traffic path via IPv6 underlay may in some cases be as follows:

Vhost0 interface 382A of vRouter 206A will host the IPv6 address used by cRPD 324 to send and receive control plane traffic for, e.g., BGP, IS-IS, OSPF, or other routing and control protocols.

Before cRPD 324 can send the actual unicast control plane packets, cRPD 324 may attempt to resolve the next-hop mac address via a IPv6 Neighbor solicitation request.

vRouter 206A will transparently send these IPv6 ND requests through the physical/fabric interface attached to it (e.g., to one of IFs 322). Similarly, on receiving a response to the solicitation request, vRouter 206A may send the response packet to the cRPD 324 as well as vRouter Agent 314.

Once cRPD 324 has resolved the nexthop link layer address, the actual unicast control plane packets can flow.

The actual unicast control plane packets may be routed by vRouter 206A to the physical/fabric interface and vice versa. The routing would happen based on the routes programmed by cRPD 324 and vRouter Agent 314.

Control plane multicast packets sent by cRPD 324 over vhost0 interface 382A may be forwarded by vRouter 206A over the physical interface. Similarly, any multicast packets coming over the physical interface may be sent to cRPD 324 using the vhost0 interface 206A.

The overlay data path traffic (SR processing) is the traffic sent and received by the user pods 422 created in server 600 (the compute node). This can be either IPv4 or IPv6 traffic.

Figure 12:
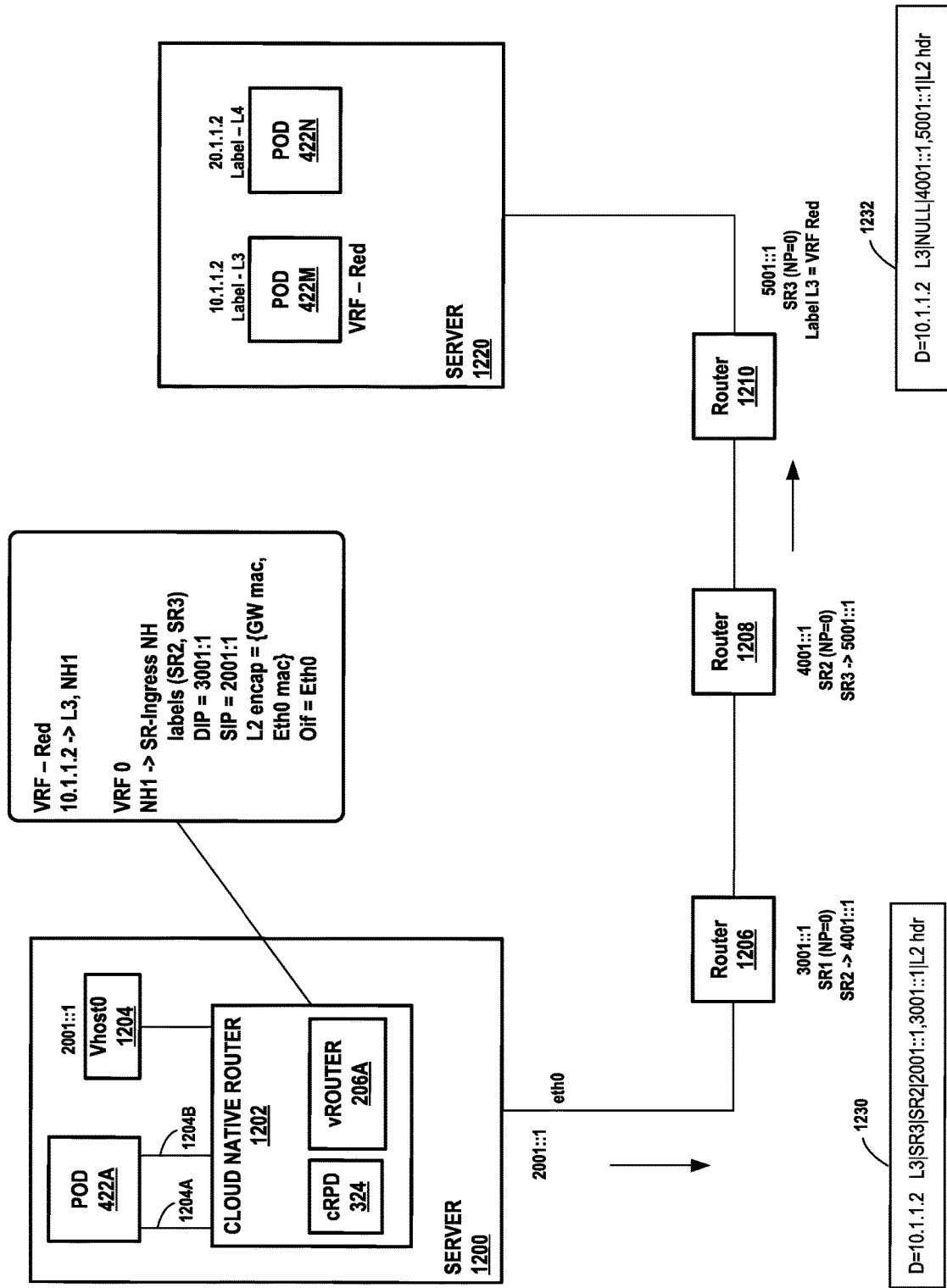
FIG. 12 illustrates an example system and packet forwarding, according to techniques described in this disclosure.

Ingress SR-MPLS processing at vCSR 20 with PHP: In the transmit direction, for the traffic sent by the Pods 422, vRouter 206A may perform the Ingress SR-MPLS processing. FIG. 12 illustrates example configuration of server 1200, 1220 and forwarding of a packet from Pod 422A on server 1200 to Pod 422M on server 1220. Cloud native router 1202 includes instances of cRPD 324 for control plane and vRouter 206A for data plane.

Interface 1204A has IP address 10.1.1.1 and Label—L1, while interface 1204B has IP address 20.1.1.1 and Label— L2. Pods 422M, 422N have similar such interfaces, and the CNR is not shown on server 1220.

In this example of FIG. 12 that relies on Segment Routing:

cRPD 324 and router 1210 along with in-between SR-capable routers 1206, 1208 are configured with ISIS/OSPF with SR capabilities to exchange the SR segment identifiers (SIDs) in terms of labels. This results in cRPD 324 and router 1210 knowing the SIDs in the network and what such SIDs correspond to.

cRPD 324 and router 1210 are also configured with BGP with inet and inet6 VPN which is used to exchange the overlay L3 VPN routes for the pod ("virtual") networks. As a result of this the service labels for the overlay routes are exchanged between cRPD 324 and router 1210.

cRPD 324 now programs the overlay routes, service label and the underlay SR-MPLS nexthop information to the vRouter 206A via the vRouter Agent (not shown in FIG. 12). The mechanics of choosing a SR path is taken care of by the cRPD 324 and optionally an SDN controller/path computation engine.

In vRouter 206A, the overlay route is programmed in the pod VRF and is associated with a service label and a SR-MPLS nexthop.

The vRouter 206A SR-MPLS nexthop consists of a list of SR-labels to push along with L3 (IPv6), L2 (Ethernet) header information and the outgoing interface all of which may be used to encapsulate the packet and send the packet out as packet 1230.

As shown in FIG. 12, once a packet is received from pod 422A, a route lookup happens in VRF red. This results in retrieval of the service label to be used for the destination (here, POD 422M) along with SR-MPLS nexthop to be used for sending the packet out. Subsequently, vRouter uses the SR-MPLS nexthop to encapsulate the packet and send it out.

The packet then reaches subsequent SR capable routers where the SID labels are popped and used to forward the packet to the next router in the path.

Finally, when the packet reaches 1210, the NULL label and Service label is popped which results in forwarding the actual overlay packet to the O-CU destination pod.

The processing without penultimate hop popping (PHP) is similar to what is described above, except that, all the SR nodes would also receive the SIDs they had advertised in the top of stack SID. They would then pop the top of stack SID and look at the next SID to forward the packet further. The final SR-Endpoint would pop both its SID and the service label and forward the overlay packet using the service label.

Figure 13:
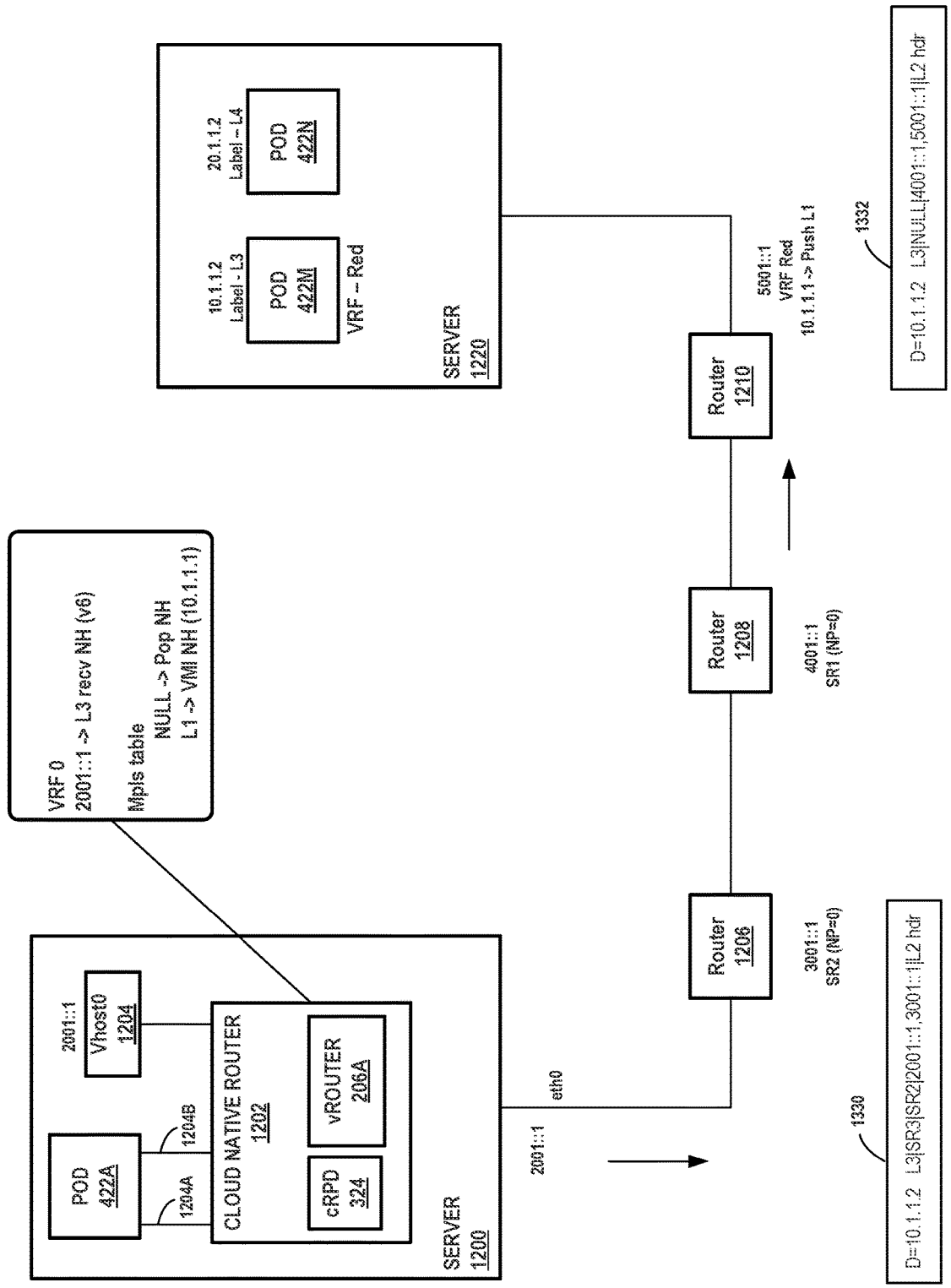
FIG. 13 illustrates an example system and packet forwarding, according to techniques described in this disclosure.

Egress SR processing at vCSR w PHP: In the receive direction, vRouter 206A would do the Egress SR processing for the traffic coming over the fabric interface for a Pod. FIG. 13 illustrates example configuration of servers 1200, 1220 and forwarding of a packet from Pod 422M to Pod 422A.

vRouter Agent 314 (not shown in FIG. 13) would install a L3 Receive NH for the vhost0 IPv6 address. This would be done at the time of vRouter Agent 314 initialization upon reading the agent .conf file which will contain the vhost0 IP address.

The Routing process would happen in both cRPD 324 and router 1210 as given in the first two steps of Ingress processing.

The Receive NH results in vRouter 206A being able to receive the incoming traffic destined to vhost0 IP address and do further processing on it.

For the incoming traffic destined to vhost0 IP address, vRouter 206A will check if the packet is an SR-MPLS packet and if so it will pop the outer NULL/vCSR SID (in case of w/o PHP) label.

Further, the vRouter 206A will pop the service label in the packet. The service label will point to the Pod VMI nexthop.

vRouter 206A will then forward the packet to the Pod using the Pod VMI's nexthop after doing necessary L2 rewrite.

The implicit NULL for the outer SR label will also be supported. In that case, there will be no SR label in the packet and processing will happen directly on the inner service label.

Figure 14:
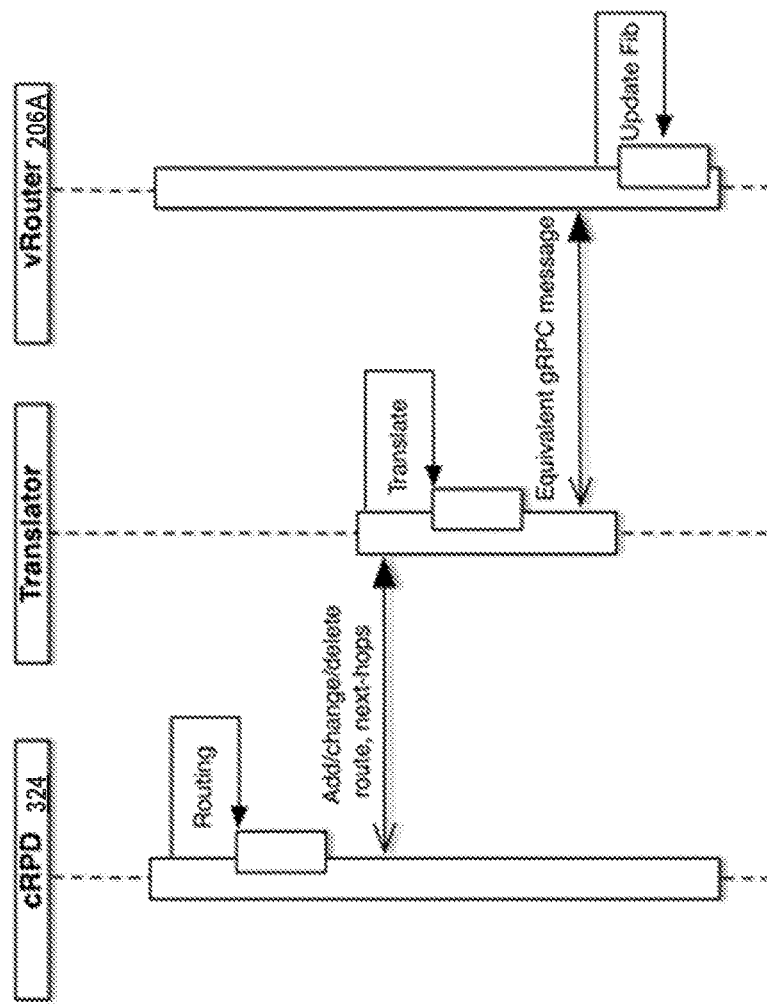
FIG. 14 is a conceptual diagram illustrating example operations for programming vRouter forwarding information, according to techniques of this disclosure.

FIG. 14 is a conceptual diagram illustrating example operations 1400 for programming vRouter forwarding information, according to techniques of this disclosure.

Figure 15:
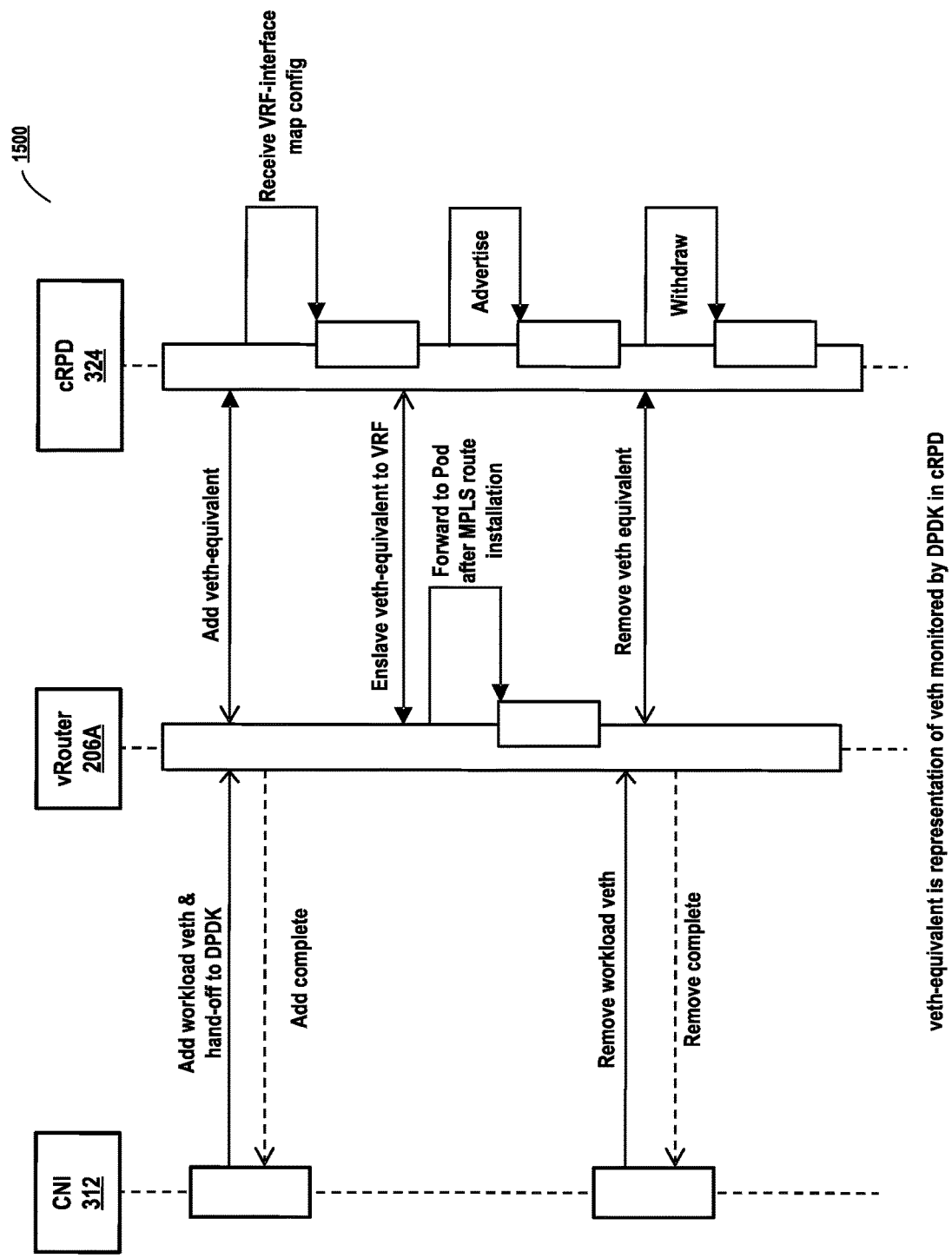
FIG. 15 is a conceptual diagram illustrating example operations for configuring and advertising a virtual network interface in a server having a cloud native router, according to techniques of this disclosure.

FIG. 15 is a conceptual diagram illustrating example operations 1500 for configuring and advertising a virtual network interface in a server having a cloud native router, according to techniques of this disclosure. Operations 15 may be similar in some respects to those described with respect to FIG. 7.

As explained with respect to FIGS. 3A-3B, DUs 22 containers may receive 5G radio traffic from Port0, which is using single root I/O virtualization (SR-IOV) to create multiple virtual functions (VFs) or instances for the physical function (port), with each VF terminating in its own Pod (one of DUs 22). These VFs are visible to the Linux kernel 380, however, they are no routing protocols run over them. Their sole purpose is to haul the radio traffic into DUs 22. DUs 22 process the radio traffic and would like to send this processed traffic over a tunnel (SR-MPLS) to the CU 5G functionality running in a data center, as described with respect to FIG. 1.

To provide reachability over tunnels, cRPD 324 may be configured with the requisite protocols (IGPs, BGP etc.). DPDK vRouter 206A would manage the physical Port1—over which routing traffic would be sent and received.

cRPD 324 may be configured with the requisite protocols through Netconf, via a domain controller. cRPD 324 will establish adjacencies for various protocols; learn and advertise the routing information (including reachability to application containers) using its routing protocols. cRPD 324 needs to program this learnt routing information to the vRouter agent 314. vRouter 206A will provide a bidirectional gRPC channel 340 for to-and-fro communication with cRPD 324. The data objects (routes, VRFs, interfaces etc.) may be modeled in protocol buffers.

The control traffic would come over a different physical port than port 0, e.g., port1. However, vRouter 206A will detect that this is control traffic (non-tunneled traffic) and forward it over vhost0 interface 382A. From the perspective of cRPD 324, all traffic would appear to come from vhost0 interface 382A. Thus, all cRPD routes will refer to vhost0 interface 382A. cRPD 324 will install these routes both to the vRouter agent 314 and to the kernel 380 (in some cases, this may involve selectively installing, using RIB/instance policy, the underlay routes in inet.0 to the kernel). vRouter agent 314 may translate routes pointing to vhost0 to port1 automatically, as illustrated in FIG. 14. The reason cRPD 324 will install the routes to the kernel 380 is because cRPD 324 might need the reachability to establish additional protocols adjacencies/sessions, e.g., BGP multihop sessions over reachability provided by IGPs. Control traffic sent by cRPD 324 to vRouter 206A over vhost0 interface 382A must be sent out of Port1 without any other further operations.

cRPD 324 may communicate with vRouter agent 314 in one of the following ways:
1. cRPD 324 will continue to emit netlink messages. An external (to cRPD 324) translator will convert these into respective gRPC messages. There may be some additional latency introduced by the introduction of this translator. This translator may be an in-place stateless entity.
2. cRPD 324 directly starts using these gRPC APIs through Kernel Routing Table multichannel or some version of FDM.

As depicted in FIG. 15, a cRPD-based CNI 312 will create the veth pairs for each of the application containers on being notified by Kubernetes/orchestration agent 310. It is the responsibility of CNI 312 to assign IP addresses to these interfaces. One end of the veth pair would terminate in the Application Container's interface. As for the other end, CNI 312 would request the vRouter 206A to start monitoring this end of the veth interfaces. This facilitates all tunneled traffic from the physical ports headed for application containers to be forwarded by DPDK without having to involve kernel 380. Finally, CNI 312 would notify the Pod to start using the DPDK/memory-mapped interface.

However, since vRouter 206A now manages one end of these veth interfaces, these are not visible from kernel 280. Hence, these interfaces are not visible to cRPD 324 and thus cRPD 324 can't announce reachability information to the outside world. To solve this problem, a veth equivalent interface is made visible to cRPD 324. This will not be an interface over which cRPD 324 could run routing protocols (as that requires using kernel facilities as sockets, TCP/IP stack etc.). This interface is there to notify cRPD 324 of reachability it needs to advertise.

vRouter 206A may directly inform cRPD 324 about this interface in some cases. This may be preferable because it is in some ways similar to how current VRFs are handled in cRPD 324. In addition, if this interface goes down, vRouter 206A can inform cRPD 324. If cRPD starts, vRouter 206A can let cRPD know of all the interfaces it is monitoring again.

With these interfaces, cRPD 324 can advertise MPLS reachability to reach the application containers. cRPD 324 can either advertise vrf-table-label or a per-nexthop label (where next-hop represents the veth equivalent) or per-prefix label. When this MPLS route may be installed to vRouter 206A, vRouter agent 314 will have the ability to translate veth-equivalent to the actual veth interface.

Below are further example sequences of operations among various components, according to one or more aspects of this disclosure:

I. Interaction Among Various Components for Creating Initial Connectivity
1. cRPD learns about vhost0 form kernel through netlink.
2. Domain controller configures (IGP and BGP) protocol configuration on cRPD via Netconf. Alternatively, an operator can use CLI on cRPD to do this manually.
3. cRPD establishes IGP adjacencies and learns network reachability and Segment Routing information.
4. cRPD programs this reachability information to the host kernel over existing netlink channel.
5. cRPD establishes BGP session over IGP learnt connectivity.
6. BGP learns l3vpn routes over this BGP session.
7. cRPD learns about workload interfaces from the vrouter. cRPD creates the subnet (say/30) and interface routes (/32) corresponding to this interface.
8. CNI configures the workload interface under specific vrfs on cRPD.
9. cRPD sends vrf-interface mapping to the vRouter.
10. cRPD imports l3vpn routes received in step 6. to the appropriate vrfs and resolves them over SR tunnels from step 3.
11. cRPD install these tunneled routes (in vrf.inet(6).0 table) to vRouter. (vrouter needs to do vhost0 to physical port0 translation).
12. Also, cRPD advertises l3vpn routes for the vrf routes from step 7.
13. cRPD install mpls.0 routes with pop label and forward to workload semantics.

II. Interaction Among Various Components when Workload Interface Goes Down.
1. vRouter notifies cRPD of interface deletion.
2. cRPD deletes subnet and interface route.
3. cRPD sends withdrawal of reachability to the workloads.
4. cRPD deletes mpls.0 tunnel routes with pop and forwarding to workload semantic from the vRouter.

III. Interaction Among Various Components on VRF Deletion.
1. cRPD internally deletes l3vpn routes received in step 6 (Interaction I.) from the appropriate vrf.
2. cRPD sends deletes for these routes (in vrf.inet(6).0 table), with tunnel next-hopss to vRouter.
3. Also, cRPD withdraws l3vpn routes for the vrf routes from step 8 (Interaction I.)
4. cRPD sends deletes to vRouter for mpls.0 routes with pop label and forward to workload semantics.

In an aspect of the disclosure, to provide high availability of network connectivity, when adding the DPDK interface to an application Pod instantiated on a compute node, CNI 312 may also add a second, backup interface into the application Pod. The backup interface may be configured on a different, backup data plane within the compute node than the from the active data plane on which the active interface is configured. For example, the active data plane may be a DPDK-based virtual router, while the backup data plane may be a kernel-based virtual router, similar to server 350 but with a kernel-based virtual router in addition to DPDK vRouter 206A.

High Availability for DPDK Forwarding Plane

Using Backup Interface for Pod Using Different Forwarding Plane

DPDK enables building applications that can bypass the kernel for packet I/O. Application can directly send/receive the packets from the NIC and can achieve high performance by using polling. Bypassing kernel for packet i/o results in better performance (as result of reducing the number of context switches, packet contents being copied and polling mode is not feasible/desirable in the kernel).

DPDK vRouter 206A will own/takeover one or more of the (physical) network ports on the system. Kernel 280 will not be able to make use of these ports for normal network I/O as long as the vRouter 206A.

In Kubernetes (K8s) cluster, DPDK applications are run inside Pods. K8s takes care of orchestrating (lifecycle management) of these Pods. Since these applications in the Pod need network connectivity, K8s uses a component called CNI to setup network interfaces, IP address assignment and routing.

After a DPDK Pod comes up (interface added by CNI), there may be a situation where DPDK data path may not be available for some reason (Datapath has crashed, being restarted or undergoing upgrade/maintenance). Applications that require high network availability, it is desirable for the application PODs to have a fall back or alternate method of traffic forwarding.

To provide high availability of network connectivity, when adding the DPDK interface to the Pod, CNI 312 will also add an additional (backup) interface into each application Pod, but goes via a data plane that is different from the one that is currently not functional.

During the window, the application (or an enhanced DPDK library running as a part of the application process) will detect the primary (DPDK) interface is down and switches to using the kernel (backup) interface.

When the DPDK vRouter 206A is not functional either due to software issues or undergoing maintenance, DPDK vRouter 206A physical ports may be released back to the kernel 380. This would allow the kernel 380 to start using these ports for forwarding the traffic till the DPDK vRouter 206A comes back and claims the ports.

To be able to achieve this, CNI 312 and/or routing stack programs the same routes into DPDK vRouter 206A and kernel 380 forwarding table, although with different next-hop interfaces. Routing stack could detect DPDK vRouter 206A being out of service (a TCP connection is used between routing stack and DPDK vRouter 206A) and update the next-hop information and bring up the core facing (physical) interface state accordingly.

Similarly, when the DPDK vRouter 206A is restored, routing stack could detect the availability and restore the routes and interface state such that application POD traffic starts going via the DPDK vRouter 206A.

By ensuring that the core facing interface(s) previously managed by vRouter 206A is/are assigned the same interface name and IP addresses, it would result in minimal disruption to the control-plane routing protocol state such as BGP.

In an aspect of the disclosure, a set of software components provides CNI functionality that address networking requirements unique to cloud native 5G network environments. The software components include a containerized routing protocol daemon (cRPD) to support a Network Service Mesh (NSM) architecture. The set of software components support NSM architecture and may provide additional capabilities such as hybrid networking (between physical and virtual infrastructure), direct reachability to a Pod from outside a cluster of compute nodes to, e.g., advertise over protocols such as BGP, set up tunnels dynamically using various technologies such as MPLS, SRv6, IP-IP/VxLAN/GRE, IPsec, etc.

In a use case of this aspect, a 5G O-RAN network may be deployed using cloud native technologies and follow the 5G split in which the DU (Distributed Unit) and CSR (Cell Site Router) are virtualized and run on a compute node. The set of software components may operate as a cell-site router to provide L3 reachability for the mid-haul for the 5G network.

The software components use cRPD to distribute Layer 3 (L3) network reachability information of the Pods not just within the cluster, but also outside the cluster. The cRPD also programs the data plane on each compute node. For better network packet I/O performance, the DU application may run in the application Pod to bypasses the kernel networking stack and abstractions, and thereby use, e.g., zero-copy mechanisms to directly send/receive packets from the physical NIC. Data Plane Development Kit (DPDK) is one such framework, and a DPDK-based virtual router may be used as a userspace data plane that leverages DPDK for high forwarding performance for this purpose.

The software components may include a DPDK-based virtual router to support DPDK applications. A CNI plugin manages the DPDK configuration for application and programs the virtual router. This may include setting up a vhost control channel and assigning IP (e.g., both IPv4 and IPv6) and MAC addresses, advertising the Pod IP addresses, and detecting and withdrawing the routes when the Pod is considered down or removed.

Most of the existing use cases for cRPD either provide control-plane-only routing functionality such as BGP Route Reflectors or drive the forwarding-planes: kernel-based or ASIC based forwarding-plane on white box platforms. The rise of containers and cloud computing led to the need for container orchestration platforms to manage the life cycle of the containers. Kubernetes (K8s) is an orchestration platform for running containerized applications in a clustered computing environment. It provides automatic deployment, scaling, networking and management of containerized applications. A K8s pod consists of one or more containers representing an instance of application and is the smallest unit that K8s can handle. All containers in the pod share the same network namespace. Container Network Interface (CNI) provides networking for application pods in Kubernetes. It takes care of setting up pod interfaces, address assignment and networking between pods in a k8s cluster and network isolation between different workloads.

CNI 312 may CNI functionality along with capabilities useful for supporting Network Service Mesh (NSM) architecture.

While there exist many CNI solutions, mainly catering to the data-center use cases, the techniques described herein may address the networking requirements unique to cloud native 5G environment by interacting with cRPD 324 to provide NSM functionality. A CNI that supports NSM architecture provides additional capabilities such as hybrid networking (between physical and virtual infrastructure), direct reachability to Pod from outside the cluster such for e.g: advertise over protocols such as BGP, setup tunnels dynamically using various technologies such as MPLS, SRv6, IP-IP/VxLAN/GRE, IPsec, etc.

A 5G O-RAN network may be deployed using cloud native technologies and follows 5G 7.2 split where the DU (Distributed Unit) and CSR (Cell Site Router) are virtualized and run on a server. CNI 312 acts as a cell-site router to provide L3 reachability for the mid-haul.

cRPD 324 distribute Layer-3 network reachability information of the Pods not just within a Kubernetes cluster (in Kubernetes deployments), but also outside the cluster. cRPD 324 also takes care of programming the forwarding-plane on each compute node/server.

For better network packet I/O performance, a DU application which runs in the application Pod bypasses the kernel networking stack and abstractions, and uses (zero-copy) mechanisms to directly send/receive packets from the physical NIC. Data Plane Development Kit (DPDK) is one such framework.

DPDK vRouter 206A is a user space data-plane that leverages DPDK for high forwarding performance. vRouter 206A supports DPDK applications. CNI 312 will take care of setting up DPDK configuration for applications and programming vrouter 206A. This includes setting up of vhost control channel and assigning IP (both IPv4 and IPv6) and mac addresses, advertise the Pod IP addresses and detect and withdraw the routes when the Pod is considered down or removed.

Other features provides by aspects described in this disclosure include:
- Using L3 routing protocols such as BGP and IS-IS to advertise network reachability of pods
- Advertising reachability within cluster and outside the cluster using BGP
- Network namespaces (supported using L3VPN and EVPN Type-5)
- ACLs and Network Policies for security and QoS
- Support for tunnels: MPLS, SR-MPLS, SRv6, SR-MPLSoIPv6, VxLAN, IPIP, GRE
- Dynamic tunnels signaled using BGP
- IPsec tunnels for traffic encryption
- Network Policies to provide security, isolation
- Integration with DPDK vRouter 206A for higher forwarding performance, encapsulation, packet filtering and QoS
- Delivery as set of containers that can deployed in K8s using an YAML specification file.

Together, the set of components that make up a CNI 312 and the cloud-native router may be considered a Kubernetes CNI, referred to herein as the Platter CNI.

To meet the goal of a 5G use case as described with respect to FIG. 1, the CNI 312 and the cloud-native router provide the following features:
- Network namespaces: Application pods should be reachable via non-default network namespace or routing instance implemented using L3VPNs.
- IPv6 Underlay: Support IPv6 underlay as required by the use-case. IGP protocols should be capable of exchanging IPv6 routes. BGP protocol sessions should be setup using IPv6 addresses.
- IPv6 Overlay: Support IPv6 overlays by assigning IPv6 addresses to the pod and advertising them over BGP.
- BGP: Platter runs on each node in k8s cluster and uses BGP to advertise pod reachability to the network. Routes advertised over BGP may carry SRv6 label stack or other tunnel encapsulation attributes.
- IGP: Each node will participate in IGP underlay to learn reachability to other BGP peers and route reflectors. IS-IS may be used to advertise host/node addresses to the network.
- SRv6: Pod traffic may be carried over SRv6 tunnels. IS-IS is used to learn segment routing SID information.
- vrouter-dpdk: For better packet I/O performance, support vrouter-dpdk as the data-plane. This includes allocation of IP and mac addresses, generating suitable DPDK configuration for the application, programming of vrouter and advertising the routes.

Deployment in a K8s cluster is performed using YAML file which contains various details about all the containers that are part of the CNI: repositories the images are hosted on, order of initialization, environment variables, configuration, and license key information. Typically, YAML file has to be customized to suite K8s deployment. A sample YAML configuration (platter.yml) for platter CNI is provided below:

```
kind: ClusterRole
apiVersion: rbac.authorization.k8s.io/v1
metadata:
    name: crpd
rules:
    - apiGroups:
        - ""
      resources:
        - nodes
      verbs:
        - list
        - watch
---
kind: ClusterRoleBinding
apiVersion: rbac.authorization.k8s.io/v1
metadata:
    name: crpd
roleRef:
    apiGroup: rbac.authorization.k8s.io
    kind: ClusterRole
    name: crpd
subjects:
- kind: ServiceAccount
  name: crpd
  namespace: kube-system
---
apiVersion: v1
kind: ServiceAccount
metadata:
    name: crpd
    namespace: kube-system
---
apiVersion: apps/v1
kind: DaemonSet
metadata:
    name: kube-crpd-worker-ds
    namespace: kube-system
    labels:
        k8s-app: kube-crpd-worker
spec:
    selector:
        matchLabels:
            name: kube-crpd-worker-ds
    template:
        metadata:
            labels:
                name: kube-crpd-worker-ds
        spec:
            affinity:
                nodeAffinity:
                    requiredDuringSchedulingIgnoredDuringExecution:
                        nodeSelectorTerms:
                            - matchExpressions:
```

```
                - key: kubernetes.io/os
                  operator: In
                  values:
                    - linux
                - key: kubernetes.io/arch
                  operator: In
                  values:
                    - amd64
                - key: "node-role.kubernetes.io/master"
                  operator: DoesNotExist
      hostNetwork: true
      tolerations:
      - operator: Exists
        effect: NoSchedule
      initContainers:
          - name: install-cni
            image: localhost:5000/platter:latest
            #Uncomment the line if loading images directly on the
            node
            #imagePullPolicy: Never
            volumeMounts:
              - name: cni
                mountPath: /host
              - name: platter-config
                mountPath: /etc/platter
              - name: node-config
                mountPath: /etc/platter-node-config
              - name: secrets
                mountPath: /etc/secrets
            securityContext:
              privileged: true
              capabilities:
                add:
                  - NET_ADMIN
                  - NET_RAW
                  - SYS_ADMIN
            env:
            - name: NODE_IP
              valueFrom:
                fieldRef:
                  fieldPath: status.hostIP
            - name: IS_MASTER
              value: "False"
            - name: CRIP_CONFIG_TEMPLATE
              value: "/etc/platter/crpd-config.tmpl"
            - name: PRIMARY_CNI
              # Set to True if Platter is primary CNI
              value: "False"
      containers:
        - name: kube-crpd-worker
          image: localhost:5000/crpd:latest
          # Uncomment the line if loading images directly on the
          node
          #imagePullPolicy: Never
          volumeMounts:
            - name: conf
              mountPath: /config
            - name: cni
              mountPath: /host
            - name: secrets
              mountPath: /etc/secrets
          securityContext:
            privileged: true
            capabilities:
              add:
                - NET_ADMIN
                - SYS_ADMIX
          env:
          - name: NODE_IP
            valueFrom:
              fieldRef:
                fieldPath: status.hostIP
          - name: IS_MASTER
            value: "False"
      volumes:
        - name: cni
          hostPath:
            path: /
        - name: conf
          hostPath:
            path: /etc/crpd
        - name: platter-config
          configMap:
            name: platter-config
        - name: node-config
          configMap:
            name: platter-node-config
        - name: secrets
          secret:
            secretName: platter-secrets
      serviceAccountName: crpd
---
apiVersion: apps/v1
kind: DaemonSet
metadata:
  name: kube-crpd-master-ds
  namespace: kube-system
  labels:
    k8s-app: kube-crpd-master
spec:
  selector:
    matchLabels:
      name: kube-crpd-master-ds
  template:
    metadata:
      labels:
        name: kube-crpd-master-ds
    spec:
      affinity:
        nodeAffinity:
          requiredDuringSchedulingIgnoredDuringExecution:
            nodeSelectorTerms:
              - matchExpressions:
                  - key: node-role.kubernetes.io/master
                    operator: Exists
      hostNetwork: true
      tolerations:
        - key: node-role.kubernetes.io/master
          operator: Exists
          effect: NoSchedule
        - key: node.kubernetes.io/not-ready
          operator: Exists
          effect: NoSchedule
        - key: node.kubernetes.io/not-ready
          operator: Exists
          effect: NoExecute
      initContainers:
        - name: install-cni
          image: localhost:5000/platter:latest
          # Uncomment the line if loading images directly on the
          node
          #imagePullPolicy: Never
          volumeMounts:
            - name: cni
              mountPath: /host
            - name: platter-config
              mountPath: /etc/platter
            - name: node-config
              mountPath: /etc/platter-node-config
            - name: secrets
              mountPath: /etc/secrets
          securityContext:
            privileged: true
            capabilities:
              add: ["NET_ADMIN"]
          env:
          - name: NODE_IP
            valueFrom:
              fieldRef:
                fieldPath: status.hostIP
          - name: IS_MASTER
            value: "True"
          - name: CRPD_CONFIG_TEMPLATE
            value: "/etc/platter/crpd-config.tmpl"
          - name: PRIMARY_CNI
            # Set to True if Platter is primary CNI
            value: "False"
      containers:
```

```
            - name: kube-crpd-master
              image: localhost:5000/crpd:latest
              # Uncomment the line if loading images directly on the
              node
              #imagePullPolicy: Never
              volumeMounts:
                - name: conf
                  mountPath: /config
              securityContext:
                privileged: true
                capabilities:
                  add: ["NET_ADMIN"]
              env:
                - name: NODE_IP
                  valueFrom:
                    fieldRef:
                      fieldPath: status.hostIP
                - name: IS_MASTER
                  value: "True"
          volumes:
            - name: cni
              hostPath:
                path: /
            - name: conf
              hostPath:
                path: /etc/crpd
            - name: platter-config
              configMap:
                name: platter-config
            - name: node-config
              configMap:
                name: platter-node-config
            - name: secrets
              secret:
                secretName: platter-secrets
      serviceAccountName: crpd
```

DPDK Application Configuration

In the case of using kernel networking capabilities, CNI 312, cRPD 324, and vRouter 206A sets up the network interface, assign IP address and setup routing, there is no direct interaction with the applications that are part of the application Pod.

Userspace data-planes like vrouter 206A use non-standard mechanisms to provide networking capabilities to application pods. This requires co-ordination of the configuration details between the CNI 312, cRPD 324, and vRouter 206A components and Pods.

When the application uses DPDK, a Unix Domain Socket (UDS) (called vhost-user adaptor) may be used between the application running in the Pod and the vrouter 206A as the control channel which is used to negotiate the data channel (virtio interface in the Pod and vhost interface on vRouter 206A) to transfer packets.

On the host, a config file is generated, which should be volume mounted into the application pod at a suitable location accessible/known to the applications. For example:
/var/run/cni/platter/<pod-id>/dpdk-config-<pod-interface>.json
A sample dpdk-config.json configuration file is provided below:

```
{
    "vhost-adaptor-path" : "...",
    "vhost-adaptor-mode" : "[client|server]",
    "ipv4-address" : "....",
    "ipv6-address" : "...",
    "mac-address" : "...",
    "vlan-id" : "...."
}
```

The application pod volume will be mounted and create the configuration file as specified by the following parameters in the configmap section of the YAML file:

```
dpdkConfigBaseDir: "/var/run/cni/platter" # Path on the host mapped into
the pod
dpdkConfigFileName: "dpdk-config.json"
```

The DPDK application may knows the location and name of the config file. Application in the pod should be able to access the pod-id as an environment variable. The system will set the permissions on the path such that the contents of the directory are accessible only when the pod-id is known.

Pod YAML Config

When components described herein are used as CNI, to leverage advanced features such as a DPDK, and VRF support, application pod YAML configuration should include additional details such as environment variables and annotations.

POD UID

DPDK application configuration may be stored in a mounted volume and the path. For security reasons, path will have pod UID inserted and the DPDK application should be aware of the UID.

A sample path is shown below:
/var/run/cni/platter/<pod-uid>/dpdk-config-<pod-ifname>.json Pod YAML should export the Pod UID as KUBERNETES__POD_UID which may be needed by DPDK application.

Annotations

Annotations may be used to set the following optional configuration details needed by Platter:

VRF Name: Used to add the interface to a routing-instance

VRF Target: Used to advertise instance routes over BGP

Sample Configuration

A sample application YAML config with environment variables and annotations is shown below:

```
apiVersion: v1
kind: Pod
metadata:
  name: ubuntu
  annotations:
    # Required when Platter is secondary CNI or have multiple interfaces
    # Platter is invoked for each network it is configured for.
    # If a network name is repeated, CNI is invoked for each repetition.
    k8s.v1.cni.cncf.io/networks: platter, platter
spec:
  containers:
    - name: ubuntu
      image: localhost:5000/ubuntu:latest
      securityContext:
        privileged: true
      env:
        - name: KUBERNETES_POD_UID
          valueFrom:
            fieldRef:
              fieldPath: metadata.uid
      volumeMounts:
        - name: dpdk
          mountPath: /config/dpdk
```

Node Config

Initial versions of Platter will use a statically defined pod network configuration loaded using a config map files. This config map is read during Platter CNI installation and stored on each node as a file. This config file holds details on per application per interface basis and includes such IP addresses, routing-instance details. Each time Platter CNI is invoked to setup a pod interface, using pod name and interface name as the key, it finds the interface configuration details required to bring up the interface.

Sample Node Config Map

A sample application YAML config (platter-node-config.yaml) with environment variables and annotations is shown below:

```
api Version: v1
kind: ConfigMap
metadata:
    name: platter-node-config
data:
    # <node-name>-<pod-name>.json
    kind-worker-ubuntu.json:
        {
            "interfaces":{
                "eth0":{
                    "mac":"aa:bb:cc:dd:ee:01",
                    "vrfName":"red",
                    "rd":"1.1.1.2:10",
                    "vrfTarget":"1:1",
                    "interface":"eth0",
                    "ipConfig":{
                        "ipv4":{
                            "address":"1.0.1.2/30",
                            "gateway":"1.0.1.1"
                        },
                        "ipv6":{
                            "address":"abcd::1.0.1.2/126",
                            "gateway":"abcd::1.0.1.1"
                        }
                    }
                },
                "net1":{
                    "mac":"aa:bb:cc:dd:ee:11",
                    "vrfName":"blue",
                    "rd":"1.1.1.2:11",
                    "vrfTarget":"1:1",
                    "interface":"net1",
                    "dataplane":"kernel",
                    "ipConfig":{
                        "ipv4":{
                            "address":"1.1.1.2/30",
                            "gateway":"1.1.1.1"
                        },
                        "ipv6":{
                            "address":"abcd::1.1.1.2/126",
                            "gateway":"abcd::1.1.1.1"
                        }
                    }
                }
            }
        }
    kind-worker2-ubuntu.json:
        {
            "interfaces":{
                "eth0":{
                    "mac":"aa:bb:cc:dd:ee:21",
                    "vrfName":"red",
                    "rd":"1.1.2.2:10",
                    "vrfTarget":"1:1",
                    "interface":"eth0",
                    "ipConfig":{
                        "ipv4":{
                            "address":"1.0.1.2/30",
                            "gateway":"1.0.1.1"
                        },
                        "ipv6":{
                            "address":"abcd::1.0.1.2/126",
                            "gateway":"abcd::1.0.1.1"
                        }
                    }
                },
                "net1":{
                    "mac":"aa:bb:cc:dd:ee:22",
                    "vrfName":"blue",
                    "rd":"1.1.2.2:11",
                    "vrfTarget":"1:1",
                    "interface":"net1",
                    "dataplane":"kernel",
                    "ipConfig":{
                        "ipv4":{
                            "address":"1.1.2.2/30",
                            "gateway":"1.1.2.1"
                        },
                        "ipv6":{
                            "address":"abcd::1.1.2.2/126",
                            "gateway":"abcd::1.1.2.1"
                        }
                    }
                }
            }
        }
```

The techniques described herein may be implemented in hardware, software, firmware, or any combination thereof. Various components, functional units, and/or modules illustrated in the figures and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

EXAMPLE 1

A system comprising a container workload; a containerized routing protocol daemon configured to execute on processing circuitry and configured to receive routing information from an external network controller; a kernel network stack configured to execute on processing circuitry and configured to route packets for the container workload based on first routing information; a DPDK-based virtual router configured to execute on processing circuitry and configured to route packets for the container workload based on second routing information; and a container networking interface plugin configured to execute on processing circuitry and configured to configure a first virtual network interface for the workload to interface with the DPDK-based virtual router and a second virtual network interface for the workload to interface with the kernel network stack.

EXAMPLE 2

The system of Example 1, further comprising: a virtual router agent for the virtual router, the virtual router agent configured to execute on processing circuitry and configured to receive the second routing information from the containerized routing protocol daemon.

EXAMPLE 3

The system of Example 1, wherein the second routing information comprises routing information for an overlay network of the computing infrastructure.

EXAMPLE 4

The system of Example 1, wherein the system operates as a virtualized cell site router for a mobile network.

EXAMPLE 5

The system of Example 1, where the workloads are distributed units (DUs) for a 5G mobile network.

EXAMPLE 6

The system of Example 1, wherein the system is a single compute node.

EXAMPLE 7

The system of Example 1, wherein the container networking interface plugin is configured to receive virtual network interface information for the virtual router from a Kubernetes infrastructure.

EXAMPLE 8

The system of Example 1, wherein the system interfaces with a Kubernetes infrastructure as a container networking interface.

EXAMPLE 9

The system of Example 1, wherein the routing information comprises segment routing information.

EXAMPLE 10

The system of Example 1, wherein virtual router agent is configured to interface with multiple different types of control planes.

EXAMPLE 11

A computing device comprising: a container networking interface plugin configured to execute on processing circuitry; an orchestration agent configured to execute on processing circuitry, wherein the orchestration agent is an agent of an orchestrator for a computing infrastructure that includes the computing device; a kernel network stack configured to execute on processing circuitry; a virtual router comprising a virtual router data plane and a virtual router agent, the virtual router configured to execute on processing circuitry; and a logically-related group of one or more containers, the computing device configured to operate to implement a backup network interface for the one or more containers.

What is claimed is:
1. A computing device comprising:
   processing circuitry;
   a containerized set of workloads;
   a containerized routing protocol process configured to execute on the processing circuitry and configured to receive first routing information and second routing information in one or more routing protocol messages received according to a routing protocol executed by the containerized routing protocol process;
   a kernel network stack executing on the processing circuitry and configured to forward packets based on the first routing information received by the containerized routing protocol process; and
   a data plane development kit (DPDK)-based virtual router executing on processing circuitry and configured to forward traffic to and from the workloads based on the second routing information received by the container- ized routing protocol process and without receiving or forwarding the traffic via the kernel network stack.

2. The computing device of claim 1, further comprising:
a virtual router agent for the virtual router, the virtual router agent executing on the processing circuitry and configured to receive the second routing information from the containerized routing protocol process.

3. The computing device of claim 1,
wherein the first routing information comprises routing information for an underlay network of a computing infrastructure, and
wherein the second routing information comprises routing information for an overlay network of the computing infrastructure.

4. The computing device of claim 1, wherein the computing device operates as a virtualized cell site router for a mobile network.

5. The computing device of claim 1, where the workloads are distributed units (DUs) for a 5G mobile network.

6. The computing device of claim 1, further comprising:
a container networking interface plugin configured to execute on the processing circuitry and configured to receive virtual network interface information for the virtual router from a Kubernetes orchestrator.

7. The computing device of claim 1, wherein the computing device interfaces with a Kubernetes orchestrator using a container networking interface.

8. The computing device of claim 1, wherein at least one of the first routing information or the second routing information comprises segment routing information.

9. The computing device of claim 1, further comprising:
a virtual router agent for the virtual router, the virtual router agent configured to execute on the processing circuitry and configured to interface with multiple different types of control planes.

10. The computing device of claim 1, wherein the containerized routing protocol process is configured to receive at least one of the first routing information or the second routing information from an external network controller or from a peer router.

11. A method comprising:
receiving, by a containerized routing protocol process executing on a computing device, first routing information and second routing information in one or more routing protocol messages received according to a routing protocol executed by the containerized routing protocol process;
receiving, by a kernel executing on the computing device and executing a kernel network stack, the first routing information from the containerized routing protocol process;
forwarding, by the kernel, packets based on the first routing information received from the containerized routing protocol process;
receiving, by a data plane development kit (DPDK)-based virtual router, the second routing information from the containerized routing protocol process; and
forwarding, by the virtual router, traffic to and from a containerized set of workloads based on the second routing information received from the containerized routing protocol process and without receiving or forwarding the traffic via the kernel network stack.

12. The method of claim 11, wherein receiving the second routing information comprises receiving, by a virtual router agent for the virtual router, the second routing information from the containerized routing protocol process.

13. The method of claim 11,
wherein the first routing information comprises routing information for an underlay network of a computing infrastructure, and
wherein the second routing information comprises routing information for an overlay network of the computing infrastructure.

14. The method of claim 11, wherein the computing device operates as a virtualized cell site router for a mobile network.

15. The method of claim 11, where the workloads are distributed units (DUs) for a 5G mobile network.

16. The method of claim 11, further comprising:
receiving, by a container networking interface, a request to add a virtual network interface for the workloads from an orchestrator; and
configuring, by the container networking interface, the virtual network interface for the workloads.

17. The method of claim 11, wherein at least one of the first routing information or the second routing information comprises segment routing information.

18. The method of claim 11, wherein receiving the routing information comprises receiving at least one of the first routing information or the second routing information from an external network controller or from a peer router.

19. A non-transitory computer-readable storage medium encoded with instructions that, when executed, cause processing circuitry to perform operations comprising:
receiving, by a containerized routing protocol process of a computing device, first routing information and second routing information in one or more routing protocol messages received according to a routing protocol executed by the containerized routing protocol process;
receiving, by a kernel of the computing device that includes a kernel network stack, the first routing information from the containerized routing protocol process;
forwarding, by the kernel, packets based on the first routing information received from the containerized routing protocol process;
receiving, by a data plane development kit (DPDK)-based virtual router, the second routing information from the containerized routing protocol process; and
forwarding, by the virtual router, traffic to and from a containerized set of workloads based on the second routing information received from the containerized routing protocol process and without receiving or forwarding the traffic via the kernel network stack.

* * * * *